(12) United States Patent
Massué et al.

(10) Patent No.: US 11,235,309 B2
(45) Date of Patent: Feb. 1, 2022

(54) IR-OXOHYDROXIDES FOR ELECTROCHEMICAL OXIDATION OF WATER AND A METHOD FOR THE PREPARATION THEREOF

(71) Applicant: Fritz-Haber-Institut Der Max-Planck-Gesellschaft, Berlin (DE)

(72) Inventors: Cyriac Massué, Berlin (DE); Sebastian Cap, Berlin (DE); Robert Schlögl, Berlin (DE)

(73) Assignee: FRITZ-HABER-INSTITUT DER MAX-PLANCK-GESELLSCHAFT, Berlin (DE)

( * ) Notice: Subject to any disclaimer, the term of this patent is extended or adjusted under 35 U.S.C. 154(b) by 410 days.

(21) Appl. No.: 16/082,231

(22) PCT Filed: Mar. 3, 2017

(86) PCT No.: PCT/EP2017/055030
§ 371 (c)(1),
(2) Date: Sep. 4, 2018

(87) PCT Pub. No.: WO2017/149130
PCT Pub. Date: Sep. 8, 2017

(65) Prior Publication Data
US 2020/0290020 A1     Sep. 17, 2020

(30) Foreign Application Priority Data

Mar. 4, 2016 (EP) ................................... 16158670

(51) Int. Cl.
*B01J 23/46* (2006.01)
*B01J 35/02* (2006.01)
(Continued)

(52) U.S. Cl.
CPC ........... *B01J 23/468* (2013.01); *B01J 35/023* (2013.01); *B01J 35/1009* (2013.01);
(Continued)

(58) Field of Classification Search
CPC .. B01J 35/023; B01J 35/1009; B01J 35/1014; B01J 23/468; C25B 1/04; C25B 11/0473
(Continued)

(56) References Cited

U.S. PATENT DOCUMENTS 4,240,934 A * 12/1980 Mieville ................ B01J 23/468
   208/138
8,357,271 B2 * 1/2013 Morimitsu ................ C25C 1/08
   204/291
(Continued)

OTHER PUBLICATIONS

Cruz et al., "Iridium Oxohydroxide, a Significant Member in the Family of Iridium Oxides. Stoichiometry, Characterization, and Implications in Bioelectrodes," *Journal of Physical Chemistry C*, 116: 5155-5168 (2012).
(Continued)

*Primary Examiner* — Cam N. Nguyen
(74) *Attorney, Agent, or Firm* — Seed IP Law Group LLP

(57) ABSTRACT

The present invention relates to a catalytically active material for the electrochemical oxidation of water, wherein the catalytically active material comprises an amorphous Ir-oxohydroxide, wherein the catalytically active material has a specific surface area ($S_{BET}$) of ≥50 m².g⁻¹; an electrode coated with the catalytically active material; a proton exchange membrane (PEM) based electrolyzer comprising the electrode; the use of the catalytically active material, the electrode or the electrolyzer the electrochemical oxidation of water; and a process for preparing the catalytically active material comprising the microwave-assisted thermal treatment of a basic solution of an Ir(III) or Ir(IV) complex.

15 Claims, 16 Drawing Sheets

(51) Int. Cl.
  B01J 35/10    (2006.01)
  C25B 1/04     (2021.01)
  C25B 11/047   (2021.01)
  B01J 37/03    (2006.01)
  B01J 37/08    (2006.01)
  C25B 11/081   (2021.01)
(52) U.S. Cl.
  CPC ......... *B01J 35/1014* (2013.01); *B01J 37/031* (2013.01); *B01J 37/08* (2013.01); *C25B 1/04* (2013.01); *C25B 11/081* (2021.01)
(58) Field of Classification Search
  USPC ...................................................... 502/325
  See application file for complete search history.

(56) References Cited

U.S. PATENT DOCUMENTS

| | | | |
|---|---|---|---|
| 9,790,605 B2* | 10/2017 | Sheehan | C25B 11/0489 |
| 10,173,210 B2* | 1/2019 | Berlinguette | C25B 9/10 |
| 2011/0207602 A1 | 8/2011 | Xu et al. | |

OTHER PUBLICATIONS

Beni et al., "Electrocatalytic oxygen evolution on reactively sputtered electrochromic iridium oxide films," *Nature* 282:281-283, 1979.
Bestaoui et al., "A Chimie Douce Route to Pure Iridium Oxide," *Chem. Mater.* 9:1036-1041, 1997.
Beutler et al., "Preparation and Ultraviolet-Visible Spectrum of Hexa-aquairidium(III)," *J.C.S. Chem. Comm.* 14:554-555, 1976.
Bockris et al., "The Electrocatalysis of Oxygen Evolution on Perovskites," *J. Electrochem. Soc.* 131(2):290-302, 1984.
Brunauer et al., "Adsorption of Gases in Multimolecular Layers," *Journal of the American Chemical Society* 60:309-319, 1938.
Carmo et al., "A comprehensive review on PEM water electrolysis," *International Journal of Hydrogen Energy* 38:4901-4934, 2013.
Carretero et al., "IrOx—carbon nanotube hybrids: A nanostructured material for electrodes with increased charge capacity in neural systems," *Acta Biomaterialia* 10:4548-4558, 2014.
Cherevko et al., "Stability of nanostructured iridium oxide electrocatalysts during oxygen evolution reaction in acidic environment," *Electrochemistry Communications* 48:81-85, 2014.
De Pauli et al., "Composite materials for electrocatalysis of $O_2$ evolution: $IrO_2+SnO_2$ in acid solution," *Journal of Electroanalytical Chemistry* 538-539:145-151, 2002.
European Commission—Directorate General Enterprise and Industry, "Critical raw materials for the EU | Report of the Ad-hoc Working Group on defining critical raw materials," version 30, published Jul. 2010 downloaded from http://ec.europa.eu/enterprise/policies/rawmaterials/documents/index_en.htm, 84 pages.
Fievet et al., "Homogeneous and Heterogeneous Nucleations in the Polyol Process for the Preparation of Micron and Submicron Size Metal Particles," *Solid State Ionics* 32-33:198-205, 1989.
Frazer et al., "The Oxygen Evolution Reaction on Cycled Iridium Electrodes," *J. Elecrtoanal. Chem.* 102:127-130, 1979.
Gamsjäger et al., "The Hydrolysis of Iridium(III)," *Journal of Chemical Society, Dalton Transactions* 9:1415-1418, 1979.
Gorlin et al., "A Bifunctional Nonprecious Metal Catalyst for Oxygen Reduction and Water Oxidation," *J. Am. Chem. Soc.* 132:13612-13614, 2010.
Goursot et al., "Relativistic Calculation of the Electronic Structure and Related Properties of $IrCl_6^{2-}$," *Inorg. Chem.* 23:305-314, 1984.
Hu et al., "Degradation mechanism of long service life $Ti/IrO_2$—$Ta_2O_5$ oxide anodes in sulphuric acid," *Corrosion Science* 44:1655-1668, 2002.
Ioroi et al., "Iridium Oxide/Platinum Electrocatalysts for Unitized Regenerative Polymer Electrolyte Fuel Cells," *Journal of The Electrochemical Society* 147(6):2018-2022, 2000.
Jørgensen, "Comparative Crystal Field Studies of some Ligands and the Lowest Singlet State of Paramagnetic Nickel(II) Complexes," *Acta Chemica Scandinavica* 9:1362-1377, 1955.
Jørgensen, "Complexes of the 4d- and 5d-Groups," *Acta Chemica Scandinavica* 10:500-517, 1956.
Jørgensen, "Electron transfer spectra of hexahalide complexes," *Molecular Physics* 2(3):309-332, 1959 (25 pages).
Katsounaros et al., "Oxygen Electrochemistry as a Cornerstone for Sustainable Energy Conversion," *Angew Chem. Int. Ed.* 53:102-121, 2014.
Kötz et al., "In-Situ Identification of $RuO_4$, as The Corrosion Product During Oxygen Evolution on Ruthenium in Acid Media," *J. Electroanal. Chem.* 172:211-219, 1984.
Krýsa et al., "Effect of coating thickness on the properties of $IrO_2$—$Ta_2O_5$ anodes," *Journal of Applied Electrochemistry* 28:369-372, 1998.
Lervik et al., "Electronic structure vs. electrocatalytic activity of iridium oxide," *Journal of Electroanalytical Chemistry* 645:135-142, 2010.
Lopez et al., "Relativistic scattered wave calculations of hexachloro- and hexabromoiridate (IV)," *J. Chem. Phys.* 81:4554-4563, 1984.
Marshall et al., "Electrochemical characterisation of $Ir_xSn_{1-x}O_2$ powders as oxygen evolution electrocatalysts," *Electrochimica Acta* 51:3161-3167, 2006.
Marshall et al., "Performance of a PEM water electrolysis cell using $Ir_xRu_yTa_zO_2$ electrocatalysts for the oxygen evolution electrode," *International Journal of Hydrogen Energy* 32:2320-2324, 2007.
Marshall et al., "Preparation and characterisation of nanocrystalline $Ir_xSn_{1-x}O_2$ electrocatalytic powders," *Materials Chemistry and Physics* 94:226-232, 2005.
McCrory et al., "Benchmarking Heterogeneous Electrocatalysts for the Oxygen Evolution Reaction," *Journal of the American Chemical Society* 135:16977-16987, 2013.
McCrory et al., "Benchmarking Hydrogen Evolving Reaction and Oxygen Evolving Reaction Electrocatalysts for Solar Water Splitting Devices," *Journal of the American Chemical Society* 137:4347-4357, 2015.
Minguzzi et al., "Observing the oxidation state turnover in heterogeneous iridium-based water oxidation catalysts," *Chemical Science* 5:5391-3597, 2014.
Moggi et al., "Photochemical Reactions of Hexachloroiridate(IV) Ion," *Inorganica Chimica Acta* 4(3):335-341, 1970.
Mráz et al., "Long service life $IrO_2/Ta_2O_5$ electrodes for electroflotation," *Journal of Applied Electrochemistry* 24:1262-1266, 1994.
Nakagawa et al., "Efficient Electro-Oxidation of Water near Its Reversible Potential by a Mesoporous $IrO_X$ Nanoparticle Film," *Journal of Physical Chemistry C Letters* 113(30):12958-12961, 2009.
Nakagawa et al., "Electrogenerated $IrO_X$ Nanoparticles as Dissolved Redox Catalysts for Water Oxidation," *J. Am. Chem. Soc.* 131:15578-15579, 2009.
Pankratov et al., "EPR Spectroscopy of Transformations of Iridium(III) and Iridium(IV) Hydroxo Complexes in Alkaline Media," *Russian Journal of Inorganic Chemistry* 56(11):1794-1799, 2011.
Poulsen et al., "A Thermodynamic and Kinetic Study of Hexachloro and Aquopentachloro Complexes of Iridium (III) in Aqueous Solutions," *J. Am. Chem. Soc.* 84(11):2032-2037, 1962.
Reier et al., "Electrocatalytic Oxygen Evolution on Iridium Oxide: Uncovering Catalyst-Substrate Interactions and Active Iridium Oxide Species," *Journal of The Electrochemical Society* 161(9):F876-F882, 2014.
Reier et al., "Electrocatalytic Oxygen Evolution Reaction (OER) on Ru, Ir, and Pt Catalysts: A Comparative Study of Nanoparticles and Bulk Materials," *ACS Catal.* 2:1765-1772, 2012.
Rodgers et al., "The Nature of Iridium (III) in Aqueous Alkaline Medium. An $^{18}O$-Tracer Study," *Inorg. Chem.* 28:379-381, 1989.
Sardar et al., "Bismuth Iridium Oxide Oxygen Evolution Catalyst from Hydrothermal Synthesis," *Chem. Mater.* 24:4192-4200, 2012.
Sardar et al., "Structural variety in iridate oxides and hydroxides from hydrothermal synthesis," *Chemical Science* 2:1573-1578, 2011.

(56) References Cited

OTHER PUBLICATIONS

Siracusano et al., "Electrochemical characterization of single cell and short stack PEM electrolyzers based on a nanosized $IrO_2$ anode electrocatalyst," *International Journal of Hydrogen Energy* 35:5558-5568, 2010.

Spurgeon et al., "Improving $O_2$ production of $WO_3$ photoanodes with $IrO_2$ in acidic aqueous electrolyte," *Phys. Chem. Chem. Phys.* 16:3623-3631, 2014.

Vuković, "Oxygen evolution reaction on thermally treated iridium oxide films," *Journal of Applied Electrochemistry* 17:737-745, 1987.

Wang et al., "Identification of an iridium-containing compound with a formal oxidation state of IX," *Nature* 514:475-478, 2014.

Winkler et al., "Modeling integrated photovoltaic-electrochemical devices using steady-state equivalent circuits," *PNAS* 110(12):e1076-e1082, 2013.

Xu et al., "A comparative study on $IrO_2$—$Ta_2O_5$ coated titanium electrodes prepared with different methods," *Electrochimica Acta* 54:1820-1825, 2009.

Xu et al., "A study on the deactivation of an $IrO_2$—$Ta_2O_5$ coated titanium anode," *Corrosion Science* 45:2729-2749, 2003.

Xu et al., "Microstructure and Electrochemical Properties of $IrO_2$—$Ta_2O_{5\text{-}Coated\ Titanium\ Anodes}$," *Journal of The Electrochemical Society* 150(6):B254-B261, 2003.

Yi, "Study on the degradation of carbon materials for electrocatalytic applications," Doctoral Thesis, Technischen Universität Berlin, Berlin Germany, 2014, 139 pages.

Zhao et al., "A High Yield Synthesis of Ligand-Free Iridium Oxide Nanoparticles with High Electrocatalytic Activity," *The Journal of Physical Chemistry Letters* 2:402-406, 2011.

Zhao et al., "Understanding the Effect of Monomeric Iridium(III/IV) Aquo Complexes on the Photoelectrochemistry of $IrO_x \cdot nH_2O$-Catalyzed Water-Splitting Systems," *Journal of the American Chemical Society* 137:8749-8757, 2015.

* cited by examiner

IR-OXOHYDROXIDES FOR ELECTROCHEMICAL OXIDATION OF WATER AND A METHOD FOR THE PREPARATION THEREOF

TECHNICAL FIELD OF THE INVENTION

The present invention relates to novel amorphous Ir-oxohydroxides, a method for the preparation thereof, and the use of the amorphous Ir-oxohydroxide for the electrochemical oxidation of water, e.g. in PEM-based electrolyzers.

BACKGROUND ART

Electrochemical oxidation of water to give hydrogen and oxygen is a key future technology for regenerative energy storage. While wind, solar photovoltaic or hydro sources produce renewable electricity, it is generally intermittent in nature. In this context, hydrogen is a key energy carrier because it can be stored either in molecular form or by reversible conversion into hydrogen carrier molecules. The stored hydrogen can later be used for combustion or, more efficiently, in hydrogen fuel cells.

Proton exchange membrane (PEM) based electrolyzers offer the most efficient operating conditions for electrochemical oxidation of water and have the capability to produce $H_2$ at high pressure. These electrolyzers are based on polymeric proton exchange membranes, such as Nafion®, which act as a gas separator between the anodic and cathodic compartments. These sulfonic-acid-functionalized polymeric proton exchange membranes require a highly acidic environment, which poses a major challenge to the electrocatalysts needed to minimize overpotentials in the anodic oxygen evolution reaction (OER).

In particular, most earth-abundant transition metal oxides such as $Co_3O_4$, $Fe_2O_3$ and $MnO_x$ show minimal stability under these conditions (International Journal of Hydrogen Energy 2013, 38, 4901).

Ir— and Ru-based compounds are the most active OER-catalysts in acidic media, however even Ru-based anodes corrode very quickly under the highly acidic environment required by the sulfonic-acid-functionalized polymeric proton exchange membranes. Only Ir-based catalysts combine high activity with relative stability in acidic OER (Journal of Electroanalytical Chemistry and Interfacial Electrochemistry 1984, 172, 211, and J. Am. Chem. Soc. 2015, 137, 4347).

The chemical state of iridium is critical in achieving stable OER-electrocatalysts at low Ir-loadings. Early electrochemical studies showed that metallic iridium films are inefficient in OER and need to be activated by an oxidative treatment (Nature 1979, 282, 281).

Most recent studies focus on the high-temperature synthesis of crystalline $IrO_2$ and mixed Ir-oxides such as $IrO_2/Ta_2O_5$. Although these catalysts require high loadings and exhibit low activity, they are generally thought to offer improved long-term stability (J Appl Electrochem 1994, 24, 1262; Corrosion Science 2003, 45, 2729; J. Electrochem. Soc. 2003, 150, B254; Electrochimica Acta 2009, 54, 1820; Angewandte Chemie International Edition 2014, 53, 102; J. Electrochem. Soc. 1984, 131, 290). It is doubtful whether these systems will ever find commercial application in the electrochemical oxidation of water, due to the requirement of high loadings (over 500 $\mu g \cdot cm^{-2}$) of the critically rare elements iridium and tantalum.

Active Ir-based electrocatalysts have been formed as anodically grown iridium oxide films (AIROF) and sputtered iridium oxide films (SIROF) (Nature 1979, 282, 281, Journal of Electroanalytical Chemistry and Interfacial Electrochemistry 1979, 102, 127, and J Appl Electrochem 1987, 17, 737). The authors of these studies highlighted the role of amorphous Ir-oxohydroxides in high-current, stable OER-electrocatalysis in contrast to crystalline $IrO_2$. However, these films are of little commercial interest since their production relies on the electrochemical oxidation of metallic iridium foils or wires, leading to high material costs.

The importance of amorphous, hydrated Ir-species was more recently confirmed by the electrochemical investigation of Ir-acetates calcined at 250° C. The resultant amorphous and hydrated Ir-species exhibited both high activity and relative stability in acidic OER (S. Cherevko et al in Electrochemistry Communications 2014, 48, 81, and T. Reier et al in Electrochem. Soc. 2014, 161, F876). In both publications, the authors deposited an Ir-acetate solution on a Ti-electrode and calcined the material between 250 and 550° C. The result is a dry film. A specific surface area cannot be determined for such a compound since BET has to be performed on powders. However, since no organic template is used by the authors (a classical method to obtain highly porous materials in dry calcination routes), one can expect rather low specific surface areas. For instance Siracusano et al. report a $S_{BET}$ of 31 $m^2 \cdot g^{-1}$ for an $IrO_2$-catalyst prepared via the sulfite-complex route and followed by calcination at 400° C. (*International Journal of Hydrogen Energy*, 2010, 35, 11, 5558-5568).

Wet chemical synthesis approaches have been used to produce a variety of Iridium catalysts. In aqueous solution, soluble iridium salts such as $K_2IrCl_6$ or $IrCl_3$ can be hydrolyzed using a strong base: at high pH>12, stable colloids of Ir-oxyhydroxo-nanoparticles can be obtained, and directly electrofloculated onto an electrode for further testing (J. Am. Chem. Soc. 2009, 131, 15578; CHEM MATER 1997, 9). However, these catalysts exhibited low activities.

Thermal treatment of the hydrolysis products above 400° C. results in crystalline Ir-oxides with low OER-activities requiring high loadings (Journal of Electroanalytical Chemistry 2010, 645, 135). No balance could be found in the literature between low-temperature oxohydroxy-species and dehydrated crystalline oxide-species obtained via calcination: both exhibit mediocre activities.

An alternative approach to calcination of dried hydrolysis products is hydrothermal treatment of the basic suspension of hydrolyzed metal precursors. Sardar et al reported the preparation of a basic suspension of hydrolyzed Ir— and Bi-precursor salts by thermal treatment: $N_2O_2$ was added as an oxidant before treating the suspension for 120 h at 240° C. in an autoclave (Chem. Sci 2011, 2, 1573, Chem. Mater. 2012, 24, 4192). This synthesis yielded polycrystalline $Bi_2Ir_2O_7$ with an average particle size of 10 nm. While the activity of this catalyst was good, the stability under real industrial conditions was not determined.

Technical Problem

Accordingly, in view of the prior art there is a demand for a catalytically active material for the anodic OER in the electrochemical oxidation of water which is both stable and highly active in PEM based electrolyzers. Further, in view of the prior art, there is a demand for providing a high yielding and efficient process for the synthesis of such a catalytically active material. There is also a demand for electrodes coated with such a catalytically active material, and PEM-based electrolyzers comprising such electrodes.

SUMMARY OF THE INVENTION

The present invention surprisingly solves the above problem by providing a catalytically active material for the electrochemical oxidation of water comprising an amorphous Ir-oxohydroxide with an excellent balance of stability and activity in the conditions used for the electrochemical oxidation of water. Specifically, the present catalytically active material can be coated on an electrode for use in the electrochemical oxidation of water. The electrode coated with catalytically active material may be used in a proton exchange membrane (PEM) based electrolyzer. Accordingly, the present catalytically active material can be used for the electrochemical oxidation of water, and achieves an excellent balance of stability and activity in PEM based electrolyzers. Moreover, the present invention provides a process for the synthesis of the catalytically active material for the electrochemical oxidation of water described above with high yield and efficiency.

The invention encompasses the following embodiments:

1. The present invention provides a catalytically active material for the electrochemical oxidation of water, wherein the catalytically active material comprises an amorphous Ir-oxohydroxide, wherein the catalytically active material has a specific surface area ($S_{BET}$) of $\geq 50$ m$^2 \cdot$g$^{-1}$, wherein the specific surface area of the catalytically active material is measured by a nitrogen physisorption experiment in an Autosorb-1C setup available from Quantachrome, wherein samples are degassed for 2 h under dynamic vacuum conditions at 80° C. before the measurement, and the specific surface area of the analyzed samples is calculated from the complete isotherm using the multipoint method.

2. The catalytically active material of item 1, wherein the $S_{BET}$ of the amorphous Ir-oxohydroxide is
  $50 \leq S_{BET} \leq 200$ m$^2 \cdot$g$^{-1}$, preferably
  $90 \leq S_{BET} \leq 150$ m$^2 \cdot$g$^{-1}$, more preferably
  $95 \leq S_{BET} \leq 125$ m$^2 \cdot$g$^{-1}$.

3. The catalytically active material of items 1 or 2, wherein the surface morphology of the catalytically active material comprises nanosized rods, which are preferably aggregated.

4. The catalytically active material of any of items 1, 2 or 3, wherein the X-ray diffraction pattern of the catalytically active material shows one broad peak at 34° and optionally one further broad peak in the range of 55 to 60.5°, preferably 56.8° to 59.8°, and/or
wherein the X-ray diffraction pattern is essentially free from a peak corresponding to cubic metallic iridium at $2\theta = 40.5°$.

5. The catalytically active material according to any of items 1, 2, 3, or 4, wherein the catalytically active material comprises at least 80 wt %, preferably at least 90 wt %, more preferably at least 95 wt %, more preferably at least 97 wt %, more preferably at least 98 wt %, more preferably at least 99 wt % of the amorphous Ir-oxohydroxide, wherein the amorphous Ir-oxohydroxide preferably conforms to formula IrO$_x$(OH)$_y$(zH$_2$O) wherein $3 < (2x+y) < 4$, x is in the range of more than 1 to less than 1.9, and z is preferably 2 or more, said amorphous Ir-oxohydroxide optionally containing one or more of potassium (K), rubidium (Rb) and chloride (Cl) in the following amounts: the total amount of K and Rb is not more than 1 wt %, preferably 0.1 to 1% wt %, and the amount of chloride is 10 wt % or less, each based on the weight of the amorphous Ir-oxohydroxide, i.e. the total weight of amorphous Ir-oxohydroxide including the weight of the optionally contained elements Rb, K and Cl, or wherein the amorphous Ir-oxohydroxide preferably conforms to below formula (II).

6. The catalytically active material according to any of items 1, 2, 3, 4, or 5, wherein the amorphous Ir-oxohydroxide has a mixed III/IV Ir-oxidation state and wherein the average redox state of the Iridium in the amorphous Ir-oxohydroxide is preferably in the range +3.20 to +3.75, or preferably +3.3 to +3.6.

7 The catalytically active material according to any of items 1, 2, 3, 4, 5 or 6, wherein the chloride content relative to the catalytically active material when measured by X-ray fluorescence analysis using the glass fusion method and a Sequential Pioneer S4 spectrometer from Bruker in an inert He-atmosphere for non-destructive analysis is 10 wt % or less of the catalytically active material, preferably 7 wt % or less of the catalytically active material, preferably 5 wt % or less of the catalytically active material, preferably 3 wt % or less of the catalytically active material, preferably 0 wt % of the catalytically active material.

8 The catalytically active material of any of items 1, 2, 3, 4, 5, 6 or 7, wherein metallic iridium is substantially absent from the surface.

9 The catalytically active material of any of items 1, 2, 3, 4, 5, 6, 7 or 8, wherein the water content of the catalytically active material is 2 to 12 wt % of the catalytically active material, preferably 4 to 10 wt % of the catalytically active material, preferably 6 to 10 wt % of the catalytically active material, preferably 8 to 10 wt % of the catalytically active material, preferably 8.3 to 9.8 wt % of the catalytically active material, measured by 10° C.min$^{-1}$ heating from 25° C. to 500° C. in 21% O$_2$/Ar (100 mLn.min$^{-1}$) in a thermogravimetric experiment.

10 The catalytically active material of any of items 1, 2, 3, 4, 5, 6, 7, 8 or 9, obtainable by the thermal treatment of hydrated Ir precursor species.

11 An electrode coated with the catalytically active material according to any of items 1, 2, 3, 4, 5, 6, 7, 8, 9 or 10.

12 A proton exchange membrane (PEM) based electrolyzer comprising the electrode according to number 11.

13 Use of the catalytically active material of any of items 1, 2, 3, 4, 5, 6, 7, 8, 9 or 10, the electrode of item 11 above, or the electrolyzer of item 12 above for the electrochemical oxidation of water.

14 A process for the synthesis of the catalytically active material according to any of items 1, 2, 3, 4, 5, 6, 7, 8, 9 or 10, comprising the microwave-assisted thermal treatment of a basic solution of an Ir(III) or Ir(IV) complex, wherein the basic solution comprises hydroxide ions in a molar ratio of:
  50:1 > hydroxide:Ir ≥ 1:100, or preferably
  40:1 ≥ hydroxide:Ir ≥ 1:1, or preferably
  10:1 ≥ hydroxide:Ir ≥ 2:1, or preferably
  10:1 ≥ hydroxide:Ir ≥ 4:1, or preferably
  6:1 ≥ hydroxide:Ir ≥ 4:1.

15 The process according to item 14 above,
wherein the microwave-assisted thermal treatment comprises the step of heating the basic solution under the influence of microwaves to 100-300° C., preferably to 150-275° C., preferably to 200-250° C., and/or
wherein the microwave-assisted thermal treatment comprises the step of heating the basic solution under the influence of microwaves for 0.1 to 4 hours, preferably for 0.5 to 3 hours, or preferably for 0.9 to 2 hours, and/or
wherein the pressure of the reaction during the microwave-assisted thermal treatment is in the range 1-100 bar, preferably 20-80 bar, preferably 40-60 bar, preferably 55 bar, and/or
wherein the basic solution comprises potassium hydroxide, and/or sodium hydroxide, and/or
wherein the Ir(III) complex is IrCl$_6^{3-}$, or wherein the Ir(IV) complex is IrCl$_6^{2-}$.

Where the present description refers to "preferred" embodiments/features, combinations of these "preferred" embodiments/features shall also be deemed as disclosed as long as this combination of "preferred" embodiments/features is technically meaningful.

Hereinafter, the use of the term "comprising" should be understood as disclosing, as a more restricted embodiment, the term "consisting of" as well, as long as this is technically meaningful.

DETAILED DESCRIPTION OF THE INVENTION

Figure 1:
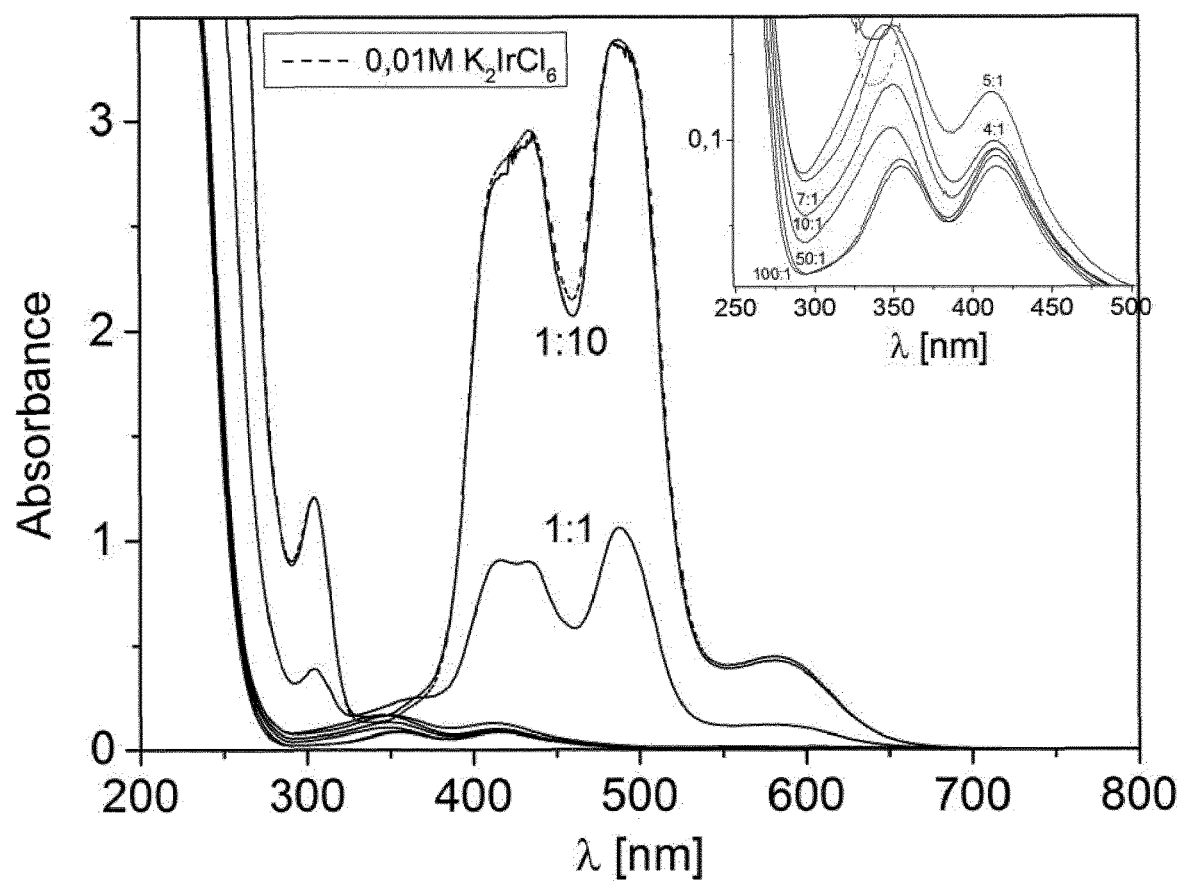
FIG. 1: UV-Vis absorption spectra of different KOH/$K_2IrCl_6$ solutions at room temperature one hour after mixing ($K_2IrCl_6$ 0.01 mol·$L^{-1}$, varying KOH:Ir ratio).

The present invention relates to a catalytically active material for the electrochemical oxidation of water. A catalytically active material for the electrochemical oxidation of water is a material which is capable of increasing the rate of the electrochemical oxidation of water without modifying the overall standard Gibbs energy change in this reaction. Catalysis can be classified as homogeneous catalysis, in which only one phase is involved, and heterogeneous catalysis, in which the reaction occurs at or near an interface between phases. The catalytically active material of the present invention is preferably a heterogeneous catalyst when used in the electrochemical oxidation of water.

The catalytically active material of the present invention comprises an amorphous Ir-oxohydroxide. Amorphous means that the XRD pattern of the catalytically active material is substantially free of well-defined diffraction peaks. A "well-defined diffraction peak" is a diffraction signal having a width of the peak at 50% of its height above the baseline of at most 3° in 2θ. The catalytically active material is substantially free of well-defined diffraction peaks if no well-defined diffraction peaks as defined above can be detected by X-ray powder diffraction measurement using the method set out in the X-ray diffraction section in the Experimental section below. For example, in FIG. 2, the metal Iridium peaks at 2θ=40.5° are "well defined", but do not belong to the amorphous Ir-oxohydroxide of the catalytically active material.

An Ir-oxohydroxide is preferably an Iridium compound having both oxo (Ir=O) and hydroxo (Ir—OH) functionalities, preferably having the following general chemical formula (I):

$$IrO_x(OH)_y(zH_2O) \quad (I)$$

wherein 3<(2x+y)<4 and 2x+y is preferably 3.2 to 3.75, more preferably 3.3 to 3.6; x is in the range of more than 1 but less than 2, e.g. 1<x<1.9; and z is preferably 2 or more and can be as high as 30, 40, 50 or even higher.

Ir-oxohydroxide can be identified by the analytical techniques explained below in the experimental section. The amorphous Ir-oxohydroxide may optionally contain one or more of potassium (K), rubidium (Rb) and chloride (Cl).

In one further preferred embodiment the amorphous Ir-oxohydroxide conforms to formula (II)

$$K_hRb_kIrCl_lO_x(OH)_y·zH_2O \quad (II)$$

wherein h is in the range 0≤h<0.15, e.g. 0<h<0.12; k is in the range 0≤k<0.15, preferably 0≤k<0.10, e.g. 0<k<0.01; l is in the range 0≤l<0.40, more preferably 0≤l<0.35, more preferably 0≤l<0.25, more preferably 0≤l<0.15, more preferably 0≤l<0.10, more preferably 0≤l<0.05, even more preferably 0≤l<0.01; and x, y and z have the same meaning as in formula (I), if no chloride is contained. If chloride is contained the following applies: 3<(1+2x+y)<4 and (1+2x+y), which reflects the oxidation state of Ir, is preferably 3.2 to 3.75, more preferably 3.3 to 3.6.

The weight of the Iridium atoms present as amorphous Ir-oxohydroxide (considering as well the optional presence of one or more of potassium (K), rubidium (Rb) and chloride (Cl)) makes up preferably at least 60% by weight, more preferably at least 65% by weight, preferably at least 70% by weight, preferably at least 75% by weight, preferably at least 80% by weight of the catalytically active material.

Without wishing to be bound by theory it is further assumed that the higher the percentage of the Iridium atoms present as amorphous Ir-oxohydroxide is, the higher the activity of the catalytically active material per unit weight will be.

The weight fraction (mass fraction) of the Iridium atoms present as amorphous Ir-oxohydroxide, which preferably conforms to the above formula (I) or (II) can be determined by the analytical techniques and calculations explained in the experimental section.

The catalytically active material of the present invention comprises at least 80 wt %, preferably at least 90 wt %, more preferably at least 95 wt %, more preferably at least 97 wt %, more preferably at least 98 wt %, more preferably at least 99 wt % of the amorphous Ir-oxohydroxide and, if present, one or more of potassium (K), rubidium (Rb) and chloride (Cl).

The total amount of rubidium and potassium can be 0% by weight. In one preferred embodiment it is at least 0.1% by weight based on the weight of the amorphous Ir-oxohydroxide, e.g. 0.2 to 1% by weight or 0.3 to 0.8% by weight. Although alkali metals other than sodium such as potassium and rubidium may also be absent, their presence may contribute to the stability of the catalytically active material.

The remainder of the catalytically active material may comprise or consist of one or more of metallic Iridium, carbon containing species such as but not limited to carbonates, and sodium. Accordingly, this remainder is preferably present in amounts up to 20 wt %, preferably in a total amount of at most 10 wt %, more preferably at most 5 wt %, more preferably at most 3 wt %, more preferably at most 2 wt %, more preferably at most 1 wt %.

In one embodiment of the invention, one or more of these materials are not contained in the catalytically active material of the present invention. The preferred contents of chlorides are described elsewhere in this application and the claims. As to the remaining materials the following applies in preferred embodiments:

- $x_{mol,Ir^0}$ the molar fraction of metallic iridium $Ir^0$ based on the total molar amount of all Ir species, as determined by TGMS (see Experimental Part), is preferably less than 0.2, more preferably less than 0.15, more preferably less than 0.10, more preferably less than 0.05, more preferably less than 0.01, even more preferably 0; and/or
- the content of carbon-containing species, such as carbonates, in particular iridium carbonate is preferably less than 1 weight %, more preferably less than 0.1 weight % of the catalytically active material; and/or
- sodium is contained in the catalytically active material in an amount of not more than 1% by weight, preferably not more than 0.1% by weight, preferably not more than 0.01% by weight, preferably not more than 0.005% by weight (50 ppm by weight);

These values are determined by XRF and/or TGMS under the conditions described in the Experimental Part.

The catalytically active material of the present invention may consist of amorphous Ir-oxohydroxide, preferably of formula (I) or (II), which optionally contains one or more of potassium (K), rubidium (Rb) and chloride (Cl), the remainder, if present, comprising or consisting of one or more impurities selected from metallic iridium, sodium, and carbon-containing species such as carbonate.

The catalytically active material of the present invention has a specific surface area ($S_{BET}$) of $\geq 50$ m$^2$.g$^{-1}$, preferably $50 \leq S_{BET} \leq 200$ m$^2$.g$^{-1}$. From the point of view of improving the activity and stability of the catalytically active material, $90 \leq S_{BET} \leq 150$ m$^2$.g$^{-1}$ is preferred and $95 \leq S_{BET} \leq 125$ m$^2$.g$^{-1}$ is the most preferred.

The specific surface area is the total surface area of the catalytically active material per unit of mass of the catalytically active material. The specific surface area of the catalytically active material according to the present invention is measured by a nitrogen physisorption experiment in an Autosorb-1C setup available from Quantachrome (as described in AUTOSORB®-1 Series, published in 2007 and available under http://www.quantachrome.com/pdf_brochures/07101.pdf), wherein samples are degassed for 2 h under dynamic vacuum conditions at 80° C. before the measurement. The data was analyzed according to the BET equation (Brunauer, S.; Emmett, P. H.; Teller, E. J. Am. Chem. Soc. 1938, 60, 309-319) and the specific surface area of the analyzed samples is calculated from the complete isotherm using the multipoint method described in this reference.

The surface morphology of the catalytically active material of the present invention preferably comprises nanosized rods.

The nanosized rods preferably occupy over 50% of the surface area of the catalytically active material, over 60% of the surface area of the catalytically active material, over 70% of the surface area of the catalytically active material, over 80% of the surface area of the catalytically active material, over 90% of the surface area of the catalytically active material, most preferably over 95% of the surface area of the catalytically active material when measured using SEM.

Without wishing to be bound to be theory, this surface morphology was observed for catalyst samples showing a further improved activity and stability of the catalytically active material and could be linked thereto. The presence and geometry of nanosized rods can be identified by examination of the surface morphology of the catalytically active material using the SEM method defined in the experimental section below. The nanosized rods according to the invention have preferably lengths in the range of from 10-150 nm, preferably 20-100 nm, and most preferably 25-60 nm. The aspect ratios (length divided by width) of the nanosized rods according to the present invention are preferably in the range 2-10, preferably 4-6. Most preferably, the nanosized rods according to the invention have length of 25-60 nm, aspect ratio of 4-6, and the catalytically active material has preferably $95 \leq S_{BET} \leq 125$ m$^2$.g$^{-1}$.

In further embodiments consider to be preferred the nanosized rods according to the present invention are aggregated. Most preferably, the aggregated nanosized rods according to the invention have length of 25-60 nm, aspect ratio of 4-6, and the catalytically active material has $95 \leq S_{BET} \leq 125$ m$^2$.g$^{-1}$.

The catalytically active material of the present invention preferably has one broad peak at at $2\theta=34°$ and optionally one further broad peak in the range of $2\theta=55$ to $60.5°$, preferably at $2\theta=56°$ to $59°$, in the XRD pattern. These are attributed to iridium oxohydroxide. The XRD spectrum within the meaning of the present invention is prepared using the method set out in the X-ray diffraction section in the Experimental section below.

A broad peak within the meaning of the present invention is a diffraction signal having a width of the peak at 50% of its height above the baseline of greater than 3° in 2θ.

Figure 2:
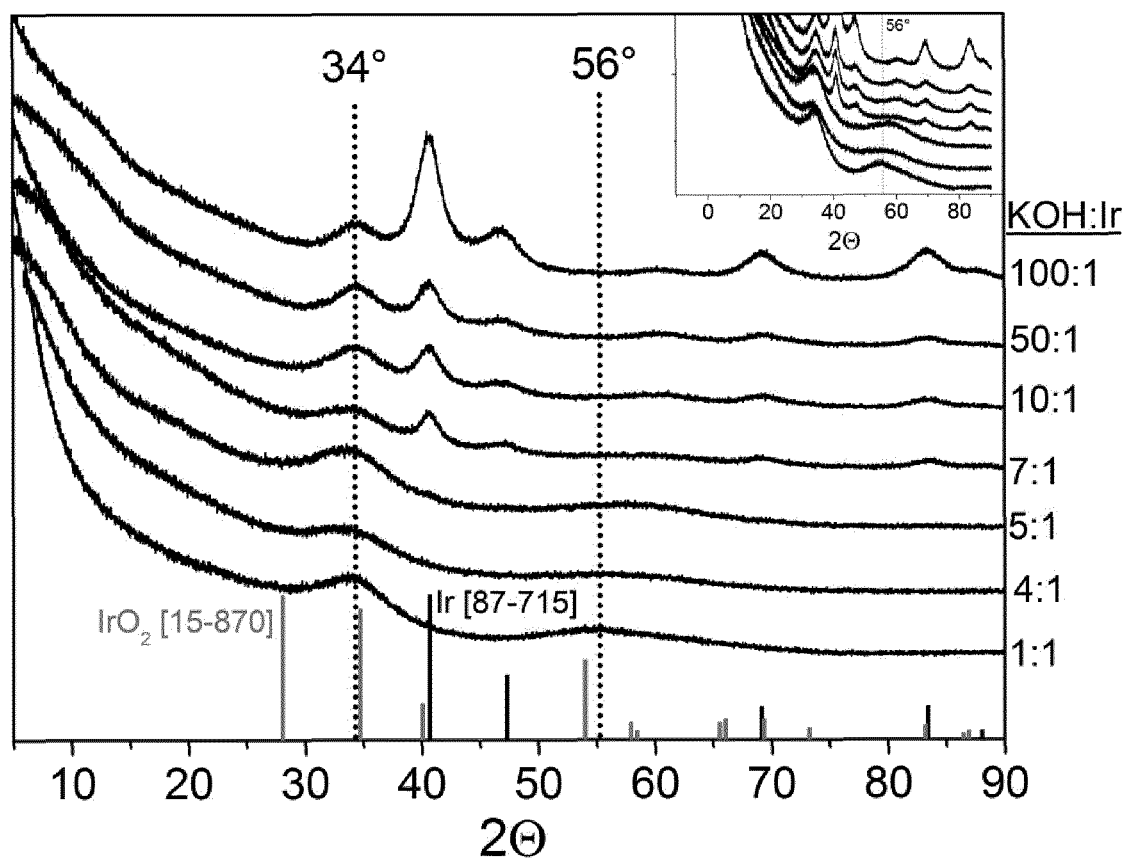
FIG. 2: X-ray diffraction (XRD) patterns of samples prepared at 250° C., 1 h.

The X-ray diffraction pattern is preferably essentially free from peaks corresponding to cubic metallic iridium including the most prominent peak at $2\theta=40.5°$ (see reference pattern from the ICDD-database for metallic Ir [87-715] and FIG. 2). The X-ray diffraction pattern is further preferably essentially free from peaks corresponding to iridium (IV) oxide including the most prominent peak at $2\theta=28.05°$ (see reference pattern from the ICDD-database for IrO$_2$ [15-870] and FIG. 2).

In the present invention, essentially free from peaks corresponding to cubic metallic iridium oxide means that the area under the most prominent peak at 2θ=40.5° is at most 10%, preferably at most 5% of the area under the broad peak at 34°.

In the present invention, essentially free from peaks corresponding to iridium (IV) oxide means that the area under the most prominent peak at 2θ=28.05° is at most 10%, preferably at most 5% of the area under the broad peak at 34°.

Such catalytically active materials are preferred as they are believed to have further improved stability and activity.

In the catalytically active material according to the present invention, the amorphous Ir-oxohydroxide preferably has a mixed III/IV Ir-oxidation state. The average redox state of the Iridium in the amorphous Ir-oxohydroxide is preferably in the range +3.20 to +3.75. This leads to the further improved stability and activity of the catalytically active material. The average redox state of the Iridium in the amorphous Ir-oxohydroxide is more preferably +3.3 to +3.6, as this further improves the stability and activity of the catalysts.

The average redox state of the amorphous Ir-oxohydroxide according to the present invention is the mean of the redox states of all of the Ir atoms present as amorphous Ir-oxohydroxide in the catalytically active material. This is calculated from the hydrogen consumption during the TPR, according to the method set out in the experimental section below.

The present invention also relates to the catalytically active material described above, wherein the chloride content relative to the catalytically active material, when measured by X-ray fluorescence analysis using a Sequential Pioneer S4 spectrometer from Bruker in an inert He-atmosphere for non-destructive analysis, is 10 wt % or less of the catalytically active material, preferably 7 wt % or less of the catalytically active material, preferably 5 wt % or less of the catalytically active material, more preferably 3 wt % or less of the catalytically active material, and most preferably 0 wt % of the catalytically active material. The reduced chloride content relative to the catalytically active material when measured by X-ray fluorescence analysis leads to an improvement in the activity and stability of the catalytically active material.

In the catalytically active material according to the present invention, metallic iridium is preferably substantially absent from the surface, as assessed using the CV (Cyclic Voltammetry) method described in the experimental section below.

Metallic iridium is substantially absent from the surface of the catalytically active material when no changes are detected from the first to the $20^{th}$ cycle below 0.2V vs. SHE in acidic media, where sharp proton-adsorption, -reduction and -desorption features characteristic of metallic iridium located on the surface of catalytically active material are to be found. The reduced presence of metallic iridium on the surface of the catalyst leads to further improved activity per unit mass of the catalytically active material.

In the catalytically active material according to the present invention, the water content of the catalytically active material preferably is 2 to 12 wt % of the catalytically active material, preferably 4 to 10 wt % of the catalytically active material, more preferably 6 to 10 wt % of the catalytically active material, more preferably 8 to 10 wt % of the catalytically active material, and most preferably 8.3 to 9.8 wt % of the catalytically active material.

The water content is measured by 10° C.min$^{-1}$ heating from 25° C. to 500° C. in 21% O$_2$/Ar (100 mLn.min$^{-1}$) in a thermogravimetric experiment, as described in detail in the experimental section below.

The water content is made up of physisorbed water and chemisorbed water.

Figure 11:
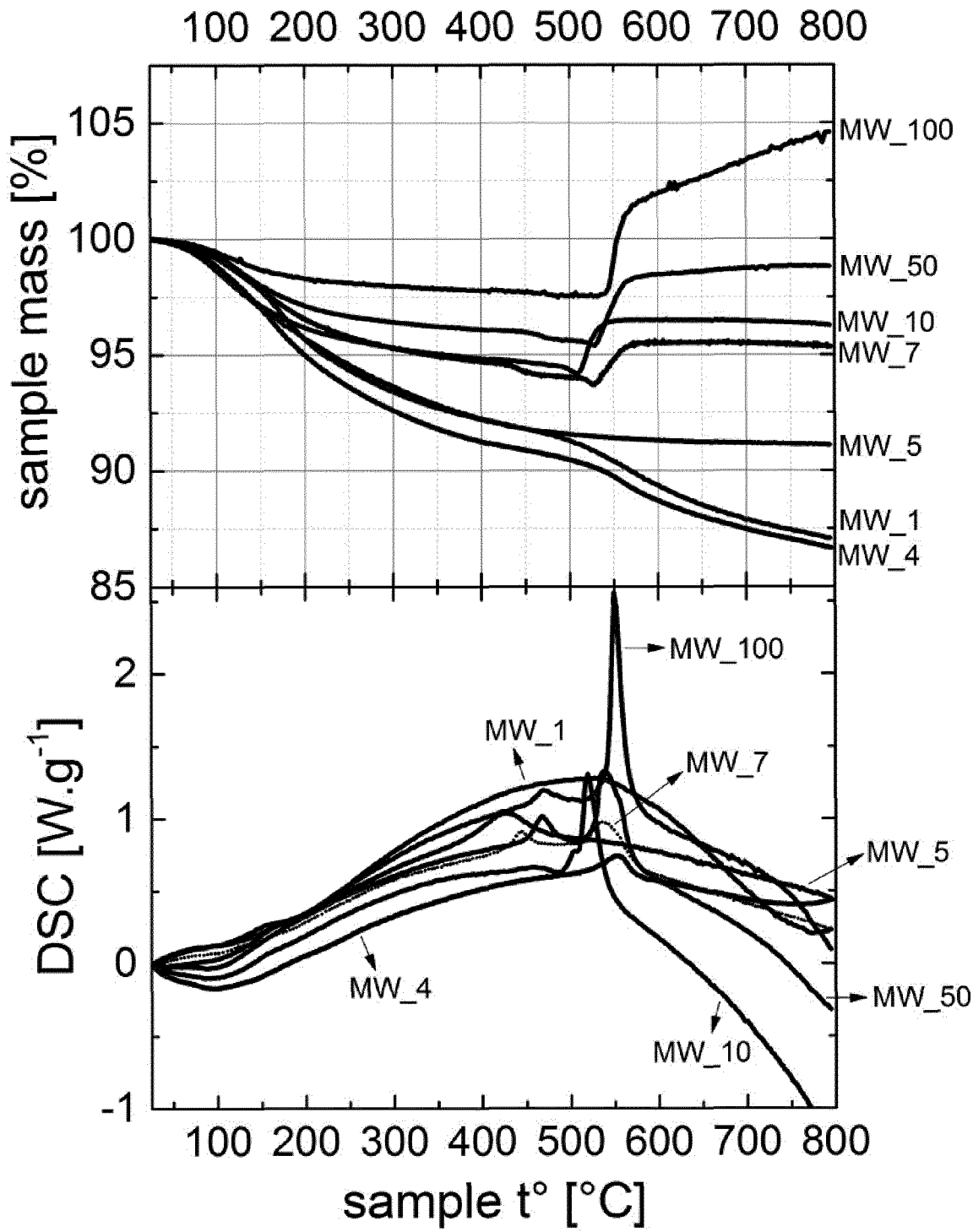
FIG. 11: Thermal gravimetric analysis (TGA) of KOH:Ir-samples (top). Corresponding differential scanning calorimetry (DSC) signals (bottom)
Figure 13:
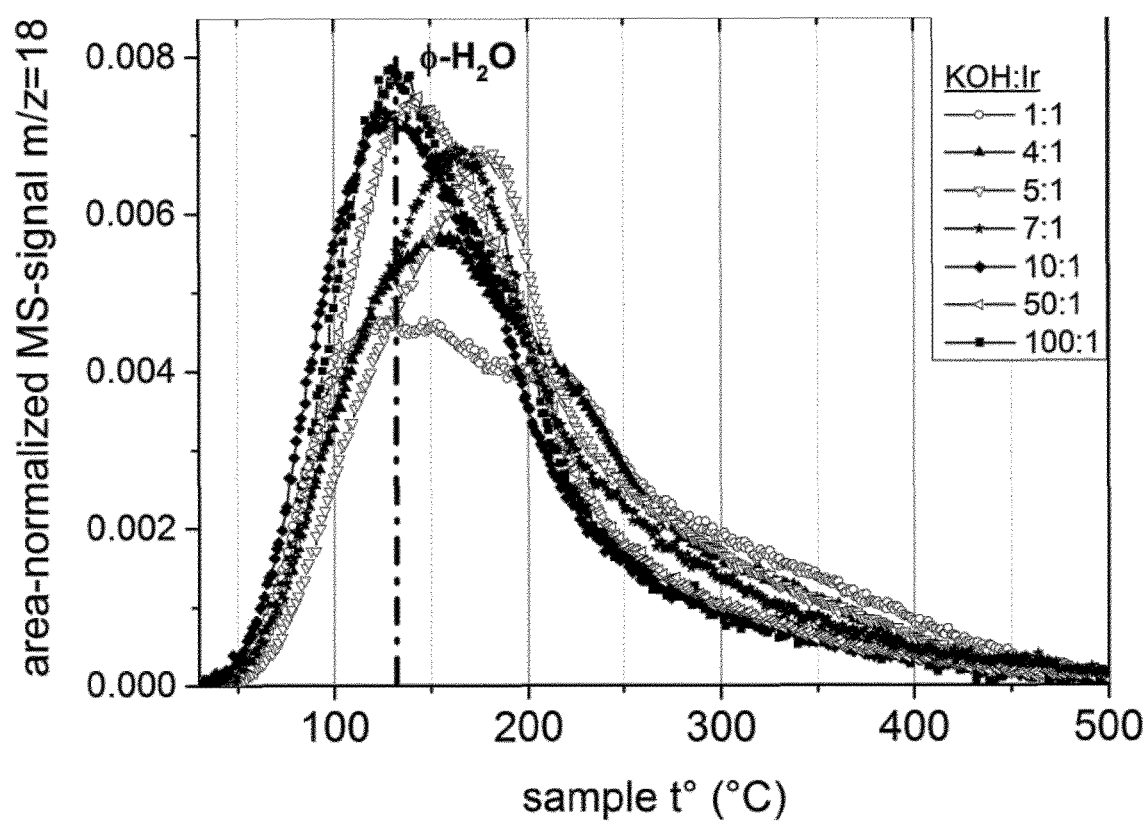
FIG. 13: Mass Spectrometry (MS) coupled (m/z=18) thermogravimetric analysis of catalytically active material according to the present invention.

The physisorbed water corresponds to zH$_2$O in the general formulae (I) and (II) for amorphous Ir-oxohydroxides IrO$_x$(OH)$_y$(zH$_2$O) given above. This corresponds to the mass loss of water detected via TGMS from 25° C. to 135° C. (see FIGS. 11 and 13). For the purpose of improving the stability and activity of the catalytically active material, the amount of physisorbed water in the catalytically active material according to the present invention is preferably in the range 1.8-3 wt % of the catalytically active material, more preferably in the range 1.8-2.7 wt % of the catalytically active material.

The chemisorbed water corresponds to (OH)$_y$ in the general formulae (I) and (II) for amorphous Ir-oxohydroxides IrO$_x$(OH)$_y$(zH$_2$O) given above. This corresponds to the mass loss of water detected via TGMS from 135° C. to 500° C. (see FIGS. 11 and 13). For the purpose of improving the stability and activity of the catalytically active material, the amount of chemisorbed water in the catalytically active material according to the present invention is preferably in the range 2.5-8 wt % of the catalytically active material, preferably in the range 5-7.5 wt % of the catalytically active material, most preferably in the range 6.5-7.1 wt % of the catalytically active material. In a more preferred catalytically active material according to the present invention, the catalytically active material the chemisorbed water content is in the range 6.5-7.1 wt % of the catalytically active material, and the physisorbed water is in the range 1.8-2.7 wt % of the catalytically active material.

In one preferred embodiment, the catalytically active material according to the present invention is obtainable by the thermal treatment of hydrated Ir precursor species. The thermal treatment according to the present invention may also be referred to as "hydrothermal" treatment, which is the technique of precipitating substances from high-temperature aqueous solutions at high vapor pressures. The thermal treatment of the present invention is a microwave-assisted thermal treatment. The use of the thermal treatment method according to the present invention delivers the catalytically active species having further improved stability and activity.

The present invention also relates to an electrode coated with the catalytically active material according to the invention as described in detail above. Preferably, the electrode is suitable for the electrochemical oxidation of water. The present invention also relates to a proton exchange membrane (PEM) based electrolyzer comprising an electrode coated with the catalytically active material according to the invention as described in detail above.

Proton exchange membrane (PEM) based electrolyzers offer the most efficient operating conditions for carrying out the electrochemical oxidation of water, and allow the production of high-purity H$_2$ at high pressure. The electrolyzers are based on polymeric membranes with proton exchange capabilities, such as Nafion®, which acts as a gas separator between the anodic and cathodic compartments. These sulfonic-acid-functionalized membranes require a highly acidic environment, which poses a major challenge to the electrocatalysts needed to minimize overpotentials.

Therefore, a particular advantage of the PEM based electrolyzers according to the present invention is the high stability of the catalytically active material in the conditions used in the electrochemical oxidation of water. In addition, the high activity of the catalytically active material makes the PEM based electrolyzers according to the present invention particularly efficient.

The invention also relates to the use of the catalytically active material as described above, in the electrode as described above, or in the electrolyzer as also described above for the electrochemical oxidation of water.

The invention also relates to the synthesis of the catalytically active material described above, comprising the microwave-assisted thermal treatment of a basic solution of an Ir(III) and/or Ir (IV) complex.

This process can be conducted as follows:
(a) a basic solution of an Ir (IV) complex is at least partially converted to an Ir (III) complex in an ageing step followed by the microwave-assisted thermal treatment of the basic solution of the Ir (III) complex;
(b) no ageing step is carried out and the basic solution of the Ir (IV) complex is directly subjected to the microwave-assisted thermal treatment which, under suitable reaction conditions, can lead in situ to the Ir (III) complex;
(c) a basic solution of an Ir (III) complex is subjected to an ageing step followed by the microwave-assisted thermal treatment.

The Ir (III) complex is preferably soluble in aqueous media, especially under the reaction conditions (p, T) of the process of the invention. In preferred embodiments it represents a hexavalent anionic complex and occurs with the required number of cationic counterions, e.g. alkali metal ions, to provide an electrically neutral chemical compound. The ligands of the Ir (III) complex are preferably inorganic such as chloride. Two preferred embodiments are $Na_3IrCl_6$ and $K_3Ir(III)Cl_6$.

Microwave assisted thermal treatment means that the basic solution of an Ir(III) or Ir(IV) complex is heated under the influence of microwaves. The use of the thermal treatment method according to the present invention delivers the catalytically active species having further improved stability and activity.

Where an Ir(IV) complex is used as starting material in the process of the invention, the Ir(IV) complex is preferably submitted to an ageing step before the microwave-assisted thermal treatment is carried out. In the ageing step, the Ir(IV) complex is contacted with base to reduce it to Ir(III). From the perspective of further improved reaction efficiency, the base is preferably the same basic solution used in the thermal treatment, e.g. potassium hydroxide, and/or sodium hydroxide.

As to the structural features of the Ir(IV) complex reference can be made to the previous description of the Ir(III) complex. Preferably, the Ir(IV) complex used in the ageing step is $IrCl_6^{2-}$. Preferably, the basic solution used in the ageing step comprises hydroxide ions, more preferably potassium hydroxide, and/or sodium hydroxide. The ageing step may be carried out for at least 0.25 h, more preferably 0.5-2 h, more preferably 1 h. Most preferably, the Ir(IV) used in the ageing step is $IrCl_6^{2-}$, the basic solution used is the same used in the thermal treatment, and the ageing step is carried out for 1 h.

Alternatively, an Ir(IV) complex can be used directly in the microwave-assisted thermal treatment under basic conditions if the reaction is allowed to proceed long enough to ensure that the Ir(IV) complex is converted in situ to the corresponding Ir(III) complex.

The basic solution for use in the microwave-assisted thermal treatment of the present invention comprises hydroxide ions in a molar ratio hydroxide:Ir of:

50:1>hydroxide:Ir≥1:100, or preferably
40:1≥hydroxide:Ir≥1:1, or preferably
10:1≥hydroxide:Ir≥2:1. More preferably, the basic solution for use in the microwave-assisted thermal treatment of the present invention comprises hydroxide ions in a molar ratio of:

10:1≥hydroxide:Ir≥4:1. The use of the basic solution in the preferred molar ratio ranges delivers a higher yield of the catalytically active material, therefore improving the efficiency of the process, while maintaining the excellent activity and stability of the catalytically active material.

Most preferably, the basic solution for use in the microwave-assisted thermal treatment of the present invention comprises hydroxide ions in a molar ratio of:

6:1≥hydroxide:Ir≥4:1, because the use of a basic solution comprising hydroxide ions in this molar ratio leads to an improvement in the stability and activity of the catalytically active material while maintaining a high yield of the catalytically active material, therefore improving the efficiency of the process.

The microwave-assisted thermal treatment according to the present invention comprises the following preferred embodiments:
(i) the step of heating the basic solution of the Ir (III) and/or Ir (IV) complex under the influence of microwaves to 100-300° C., preferably to 150-275° C., preferably to 200-250° C. (Heating the basic solution under the influence of microwaves to the most preferred temperature range delivers a higher yield of the catalytically active material, therefore improving the efficiency of the process), and/or
(ii) the step of heating the basic solution of the Ir (III) and/or Ir (IV) complex under the influence of microwaves for 0.1 to 4 hours, preferably for 0.5 to 3 hours, or preferably for 0.9 to 2 hours, and/or
(iii) the pressure of the reaction during the microwave-assisted thermal treatment according to the present invention is in the range 1-100 bar, preferably 20-80 bar, preferably 40-60 bar, preferably 55 bar, and/or
(iv) the basic solution according to the present invention comprises potassium hydroxide, and/or sodium hydroxide. The Ir(III) complex according to the present invention is $IrCl_6^{3-}$, and the Ir(IV) complex is $IrCl_6^{2-}$.

A preferred process according to the present invention therefore comprises all fours steps/embodiments (i) to (iv) at the same time.

A more preferred process according to the present invention therefore comprises the microwave-assisted thermal treatment of a basic solution of an $IrCl_6^{3-}$ or $IrCl_6^{2-}$ complex, wherein the basic solution comprises hydroxide ions in a molar ratio hydroxide:Ir of 6:1≥hydroxide:Ir≥4:1, wherein the microwave-assisted thermal treatment comprises the step of heating the basic solution under the influence of microwaves to 200-250° C. for 0.9 to 2 hours, wherein the pressure of the reaction during the microwave-assisted thermal treatment is in the range 40-60 bar, wherein the basic solution comprises potassium hydroxide, and/or sodium hydroxide.

Without wishing to be bound by theory, Ir(III) is believed to be the required precursor capable of forming the catalytically active material of the present invention. The active component of this material, i.e. the amorphous iridium oxohydroxide, preferably has a mixed III/IV oxidation state. This mixed oxidation state can be generated in the process of the invention since, under the chosen reaction conditions, Ir(III) is believed to disproportionate to the required extent into higher and lower oxidation states. Other mechanistic pathways leading to the mixed III/IV oxidation state of iridium observed in the final product may also exist.

Experimental Part

Preparation and Ageing of Precursor Solutions

Concentrated KOH solutions ([KOH]=0.001 mol·L$^{-1}$ to 1 mol·L$^{-1}$) were prepared from Millipore-filtered water and KOH (available from AppliChem, p. a.). The basic solutions were kept under Ar-atmosphere through bubbling in order to avoid $CO_2$ contamination. $K_2IrCl_6$ (available from Alfa Aesar, Ir 39% min.) was then added in order to reach a concentration of 0.01 mol·L$^{-1}$ to prepare solutions with KOH:Ir ratios of 1:10, 1:1, 4:1, 5:1, 7:1, 10:1, 50:1, and 100:1. Samples prepared by hydrothermal treatment will be identified as "MW_X", where X identifies the base to iridium ratio.

These solutions were left stirring at room temperature for 1 h under a stream of Argon. During this time, UV-Vis absorption spectra of precursor solutions were recorded between 200 and 800 nm in 1 mm-wall-to-wall quartz cuvettes using a Lambda 25 spectrophotometer (Perkin Elmer). These spectra were used to study the reduction, hydrolysis and condensation phenomena occurring in the KOH/$K_2IrCl_6$ precursor solutions.

FIG. 1 shows the absorption spectra of precursor solutions ranging from KOH:Ir=1:10 to 100:1. The dotted line present in FIG. 1 is the absorption spectrum of a 0.01 mol·L$^{-1}$ $K_2IrCl_6$ solution (Molecular Physics 1959, 2, 309; The Journal of Chemical Physics 1984, 81, 4554; Inorg. Chem. 1984, 23, 305).

Under basic conditions, $IrCl_6^{2-}$, which is a well-known outer-sphere oxidant, first reduces to $IrCl_6^{3-}$ according to the following reaction:

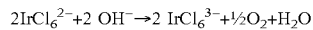

$$2IrCl_6^{2-}+2\ OH^-\rightarrow 2\ IrCl_6^{3-}+\tfrac{1}{2}O_2+H_2O$$

FIG. 1 shows that after one hour, all solutions with KOH:Ir≥4:1 exhibit only two weak bands at 346-356 nm and 413-415 nm attributed to the reduction product $IrCl_6^{3-}$ (Acta Chemica Scandinavica—ACTA CHEM SCAND 1956, 10, 500). Only for KOH:Ir=1:10 and 1:1, are the LMCT-features still clearly recognizable, indicating only partial reduction of $IrCl_6^{2-}$ to $IrCl_6^{3-}$. Without wishing to be bound by theory, this may explain the lower yield observed for these samples, as $IrCl_6^{2-}$ is stable under hydrothermal conditions and does not yield a solid product.

In comparison, $IrCl_6^{3-}$ exhibits a strong propensity towards hydrolysis, even at room temperature. When treated with base, $IrCl_6^{3-}$ forms the hexa-aquairidium(III) complex following reaction according to J. Chem. Soc., Chem. Commun. 1976, 554:

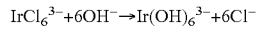

$$IrCl_6^{3-}+6OH^-\rightarrow Ir(OH)_6^{3-}+6Cl^-$$

Microwave-Supported Hydrothermal Treatment

After one hour of ageing, 62 mL of the resulting precursor were filled into 100 mL-PTFE-lined vessels. The vessels were placed in a microwave reactor setup (Anton Paar, Multiwave PRO) and heated up using a 10° C.min$^{-1}$ ramp under constant stirring with magnetic PTFE-stirrers. The temperature inside the vessel was maintained at 150 to 250° C. for 1 h. The pressure inside the vessel was in the range of 1-55 bar. The resulting black product was centrifuged at 8000 rpm for 10 min, redissolved in Millipore-filtered water, sonicated for 5 minutes and re-centrifuged until the conductivity of the supernatant was below 0.05 mS.cm$^{-1}$. The solid product was subsequently dried at 80° C. for 12 h and ground in a mortar.

TABLE 1

Elemental XRF-analysis (Sequential Pioneer S4 spectrometer, Bruker, inert He-atmosphere for non-destructive analysis. The glass fusion method was used to prepare the sample. Synthesis yield was calculated using molar masses determined in the below section "Sample composition and average Ir-oxidation state".)

| KOH:Ir | Synthesis temperature/° C. | Molar Ratio K/Ir | Molar Ratio Rb/Ir | Molar Ratio Cl/Ir | Synthesis yield [%] |
|---|---|---|---|---|---|
| 1:1 | 250 | 0.0025 | 0.0047 | 0.433 | 51 |
| 4:1 | 250 | 0.0039 | 0.0036 | 0.299 | 97 |
| 5:1 | 250 | 0.0184 | 0.0046 | 0 | 99 |
| 5:1 | 200 | — | — | — | — |
| 5:1 | 150 | 0.0931 | 0.0043 | 0 | 92 |
| 7:1 | 250 | 0.091 | 0.0041 | 0 | 100 |
| 10:1 | 250 | 0.1126 | 0.0047 | 0 | 99 |
| 50:1 | 250 | 0.092 | 0.0046 | 0 | 72 |
| 100:1 | 250 | 0.0364 | 0.0044 | 0 | 35 |
| AA-IrO$_x$ | — | 0 | 0 | 0 | — |

The yield calculated from the measured Ir-weight fraction indicates a strong Ir-loss for KOH:Ir≤1:1 and 50:1. Without wishing to be bound by theory, the low yields for compositions in which KOH:Ir≤1:1 may be due to the incomplete reduction of $IrCl_6^{2-}$ to $IrCl_6^{3-}$ in these solutions, as discussed above. Meanwhile, where the composition has KOH:Ir≥50:1, without wishing to be bound by theory, the low synthesis yield may be due to the relative stability of hexahydroxoiridate-(III) in high [OH$^-$] solutions due to fast hydroxyl-ligand exchange kinetics hindering condensation of Ir-hydroxides via oligomerization. This may reduce condensation under hydrothermal treatment conditions (Inorg. Chem. 1989, 28, 379). Another consequence of highly basic precursor solutions is the formation of OER-inactive metallic Ir$^0$: for KOH:Ir≥7:1, increasingly strong peaks corresponding to cubic Ir$^0$ are detected in the XRD-pattern (see XRD discussion below).

As can be understood from Table 1 above, an optimum was reached at about MW_5: the synthesis yield was close to maximum, no trace of chlorides was detected and only a weak shoulder at 40.5° indicated possible Ir$^0$-traces.

X-Ray Diffraction (XRD)

Standard measurements were performed on a STOE STADI P transmission diffractometer equipped with a primary focusing germanium monochromator (Cu Kα1 radiation) and a linear position sensitive detector. The samples were mounted in the form of small amounts of powder sandwiched between two layers of polyacetate film and fixed with a small amount of X-ray amorphous grease.

XRD patterns of samples prepared at 250° C., 1 h show one broad peak around 34° and, as a rule, a second broad peak in the range of 55° to 60.5°, both being attributable to iridium oxohydroxide, see FIG. 2. The broad peak located at 56° for MW_1 is visible in the graphical representation shown in the top left part of the figure. This peak gradually shifts towards higher 2θ-values, reaching 60.5° for KOH:Ir=100:1. It is located at 57.0° for MW_4 and at 59.5° for MW_7.

These are similar to the peaks that have previously been observed for electrochemically grown Ir-oxohydroxides (J. Phys. Chem. C 2012, 116, 5155; Acta Biomater 2014, 10, 4548). Samples prepared using KOH:Ir≥7:1 exhibited increasingly strong peaks corresponding to cubic metallic iridium (J. Phys. Chem. C 2012, 116, 5155; Acta Biomater 2014, 10, 4548).

Reference patterns from the ICDD-database for metallic Ir [87-715] and IrO$_2$ [15-870] were inserted in FIG. 2. According to these references, the position and relative intensity of the IrO$_2$-peaks is indicated by the gray bars, the position and relative intensity of the Ir-peaks is indicated by the black bars.

Once again, it is noted that an optimum was reached for samples prepared using KOH:Ir of 5:1: no trace of chlorides was detected and only a weak shoulder at 40.5° indicated possible Ir$^0$-traces.

Linear Sweep Voltammetry (LSV)

In order to select the best OER-electrocatalyst, sample-containing inks were coated on a rotating disk electrode (RDE, glassy carbon support) and tested in a standard three-compartment cell containing H$_2$SO$_4$ (0.5 mol·L$^{-1}$) as an electrolyte. Loadings were kept constant at 20 µg$_{Ir}$.cm$^{-2}$. OER activity was assessed using linear sweep voltammetry (LSV) at a sweep rate of 5 mV.s$^{-1}$ from E$_{oc}$ to 2V vs. SHE at 1600 rpm for all samples. The overpotential needed to reach j=10 mA.cm$^{-2}$ is used as a measure of the activity as it is a commonly used value in the literature. The overpotential is given by:

$$\eta = E_{WE} - (1.23 - 0.059 \times pH)$$

Two commercial reference samples were used:

1) one amorphous ultrapure iridium oxohydroxide compound (Ir(IV) oxide, Premion®, 99.99% metals basis, Ir 84.5% min, available from Alfa Aesar, referred to in the following as "AA-IrO$_x$"), that was found to be the most impurity free (no Cl or alkali metals) and the most readily OER-active Ir-sample commercially available. AA-IrO$_x$ also exhibits a comparable XRD-structure to our samples.

2) Additionally, a crystalline IrO$_2$-reference was used (99.9% trace metals basis, available from Sigma Aldrich, referred to in the following as "SA-IrO$_2$").

Figure 3:
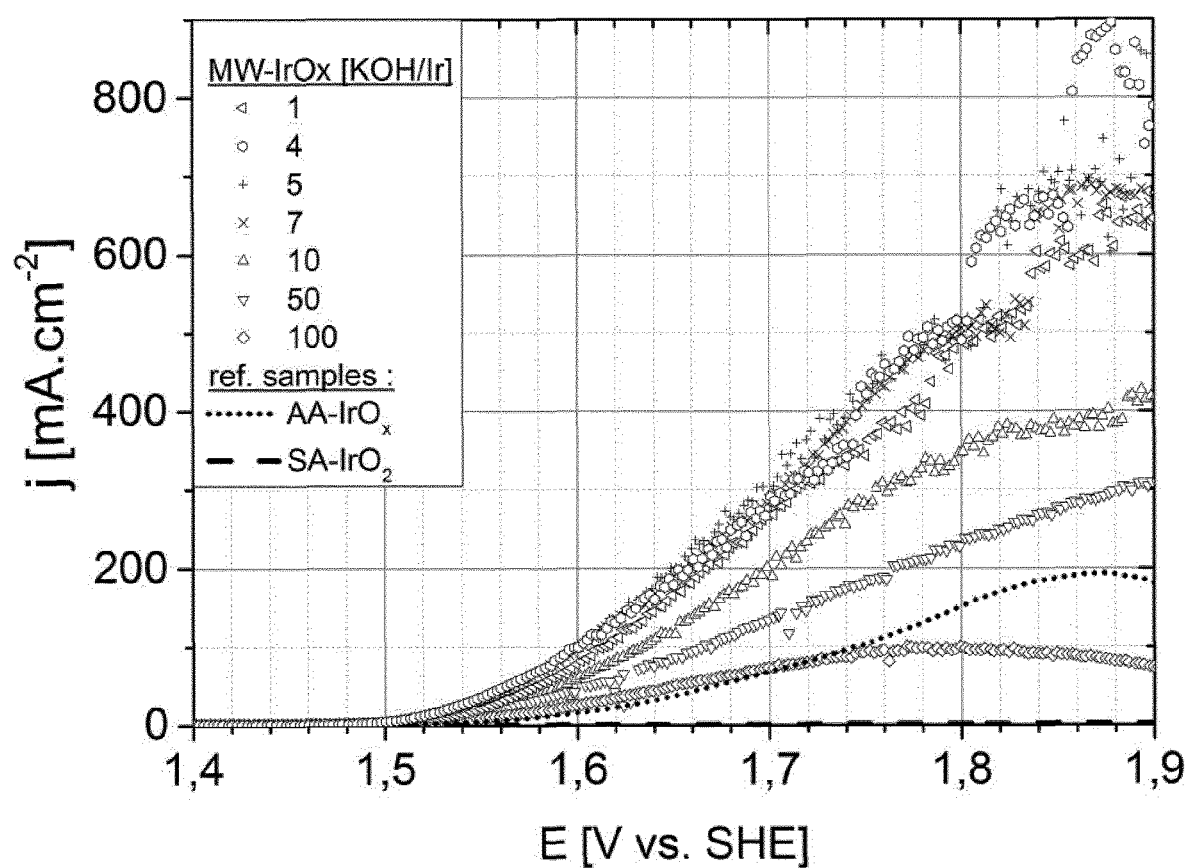
FIG. 3: Linear sweep voltammograms of samples produced at 250° C., 1 h.

The LSV of samples produced at 250° C., 1 h shown in FIG. 3 indicate vastly superior activity than commercial reference samples. SA-IrO$_2$ did not reach j=10 mA.cm$^{-2}$ below 2V vs. SHE, while AA-IrO$_x$ required a higher overpotential (n) than any of the catalytically active materials according to the invention.

Figure 4:
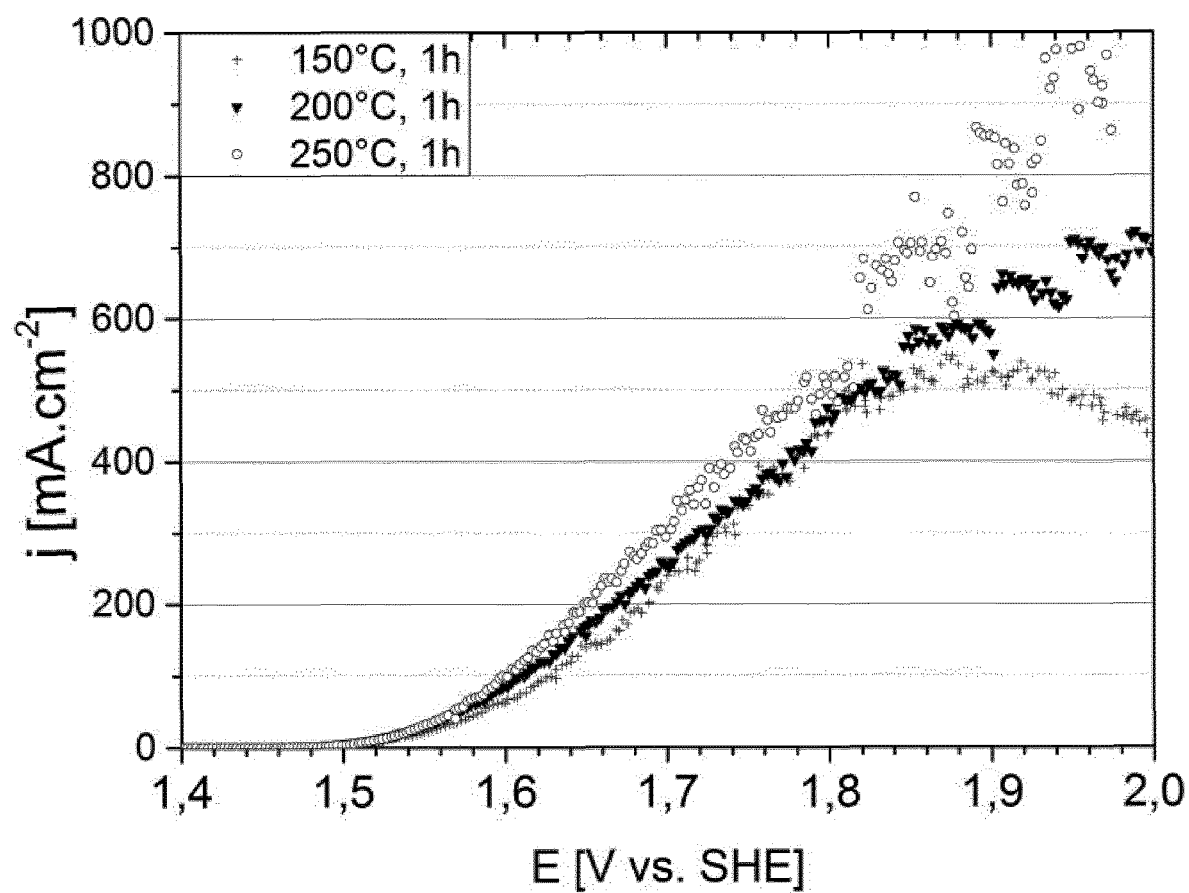
FIG. 4: Linear sweep voltammogram shows the activity of the catalysts with KOH:Ir=5:1 prepared at 150° C., 100° C., and 250° C.

FIG. 4 LSV shows that for MW_5, hydrothermal treatment at 250° C., 1 h yields the most active catalyst.

The data in Table 2 below show the activity of the catalytically active materials according to the invention, compared to the activity of MW_50, MW_100, SA-IrO$_2$, and AA-IrO$_x$.

TABLE 2

Activity/Overpotential

| Catalyst | Overpotential $\eta_{t=0}$ @ 10 mA · cm$^{-2}$ [V] |
|---|---|
| MW_1 | 0.32 |
| MW_4 | 0.31 |
| MW_5 | 0.31 |
| MW_7 | 0.31 |
| MW_10 | 0.32 |
| MW_50 | 0.32 |
| MW_100 | 0.34 |
| AA-IrO$_x$ | 0.37 |
| SA-IrO$_2$ | Did not reach j = 10 mA · cm$^{-2}$ below 2 V vs. SHE |

Cyclic Voltammetry (CV)

Figure 5:
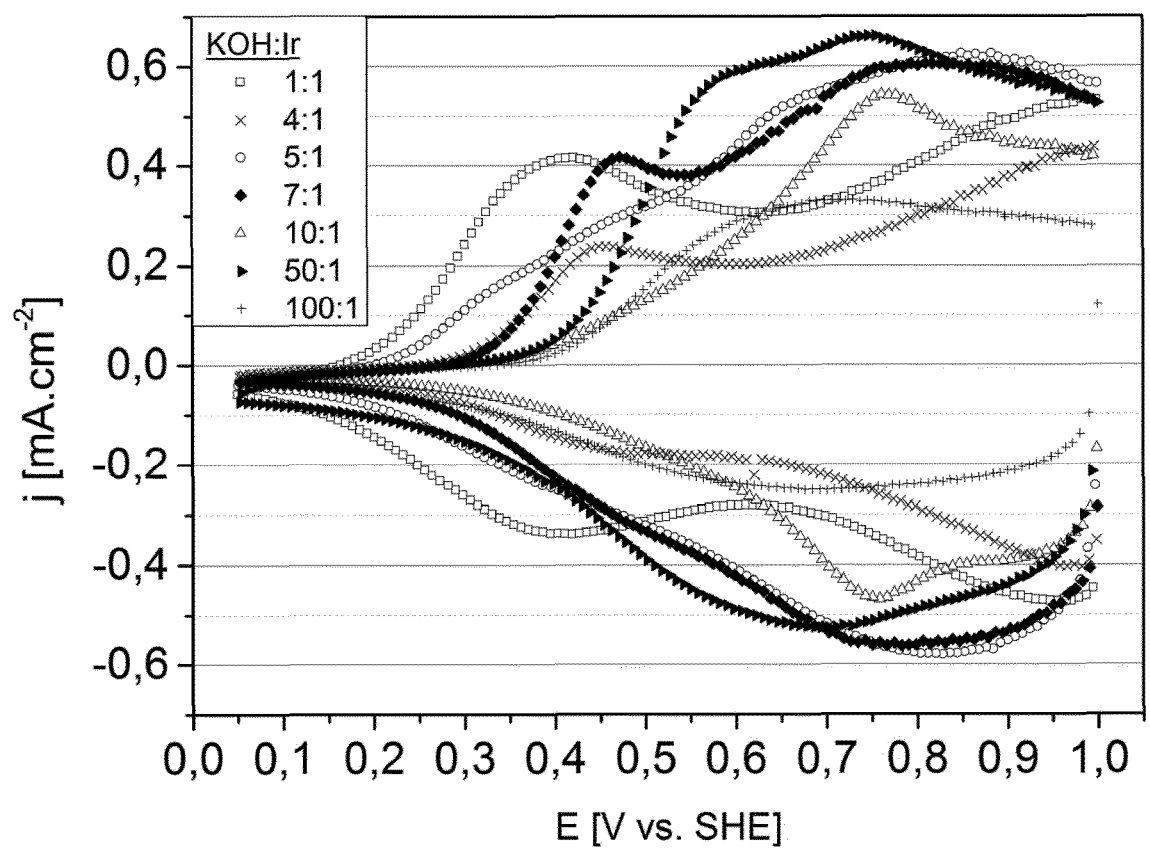
FIG. 5: Cyclovoltammetric assessment of the samples.

CV was conducted without rotation from open circuit potential (E$_{oc}$) between 0.05 and 1V vs. SHE (Standard Hydrogen Electrode) at a sweep rate of 50 mV.s$^{-1}$. The cycles shown in FIG. 5 correspond to the 20$^{th}$ cycle in order to exclude contributions from C-impurities. No important changes were detected between the first and the 20$^{th}$ cycle below 0.2V vs. SHE, where sharp proton-adsorption, -reduction and -desorption features characteristic of metallic iridium surfaces are located. Therefore, CV confirmed the complete absence of metallic iridium on the surface for all samples.

Stability

Stability was assessed in chronopotentiometric (CP) experiments at 15 mA.cm$^{-2}$. The reported lifetime corresponds to the time lapse required by the working electrode to reach 1.8 V vs. SHE. Samples were considered deactivated when the working electrode potential (E$_{WE}$) reached 1.8V vs. SHE in order to avoid oxidative damage to the GC-electrode support. This characteristic potential is reached during a sharp potential increase characterizing the short deactivation period following a long region of relatively stable potential (see FIG. 6).

Figure 6:
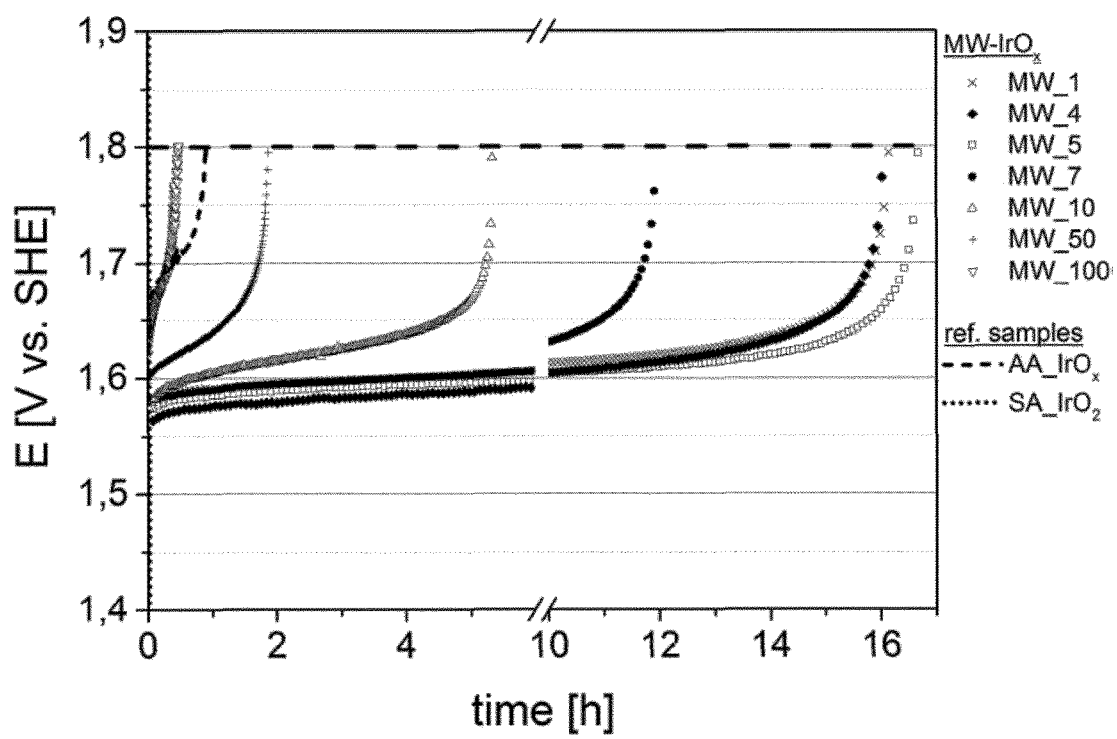
FIG. 6: Chronopotentiometric (CP) analysis of the catalysts at 15 mA·$cm^{-2}$.

FIG. 6 shows that the most stable sample according to the invention (MW_5) survives 33 times longer than AA-IrO$_x$ for 20 µg$_{Ir}$.cm$^{-2}$. SA-IrO$_2$ did not show any stability at j=15 mA.cm$^{-2}$. The data in Table 3 show the stability of the catalytically active materials according to the invention, compared to that of MW_50, MW_100, and AA-IrO$_x$.

TABLE 3

Stability tests

| Catalytically Active Material | Time of death at 15 mA · cm$^{-2}$ [h] |
|---|---|
| MW_1 | 16.2 |
| MW_4 | 16 |
| MW_5 | 16.7 |
| MW_7 | 12 |
| MW_10 | 5.3 |
| MW_50 | 1.9 |
| MW_100 | 0.9 |
| AA-IrO$_x$ | 0.5 |

Figure 7:
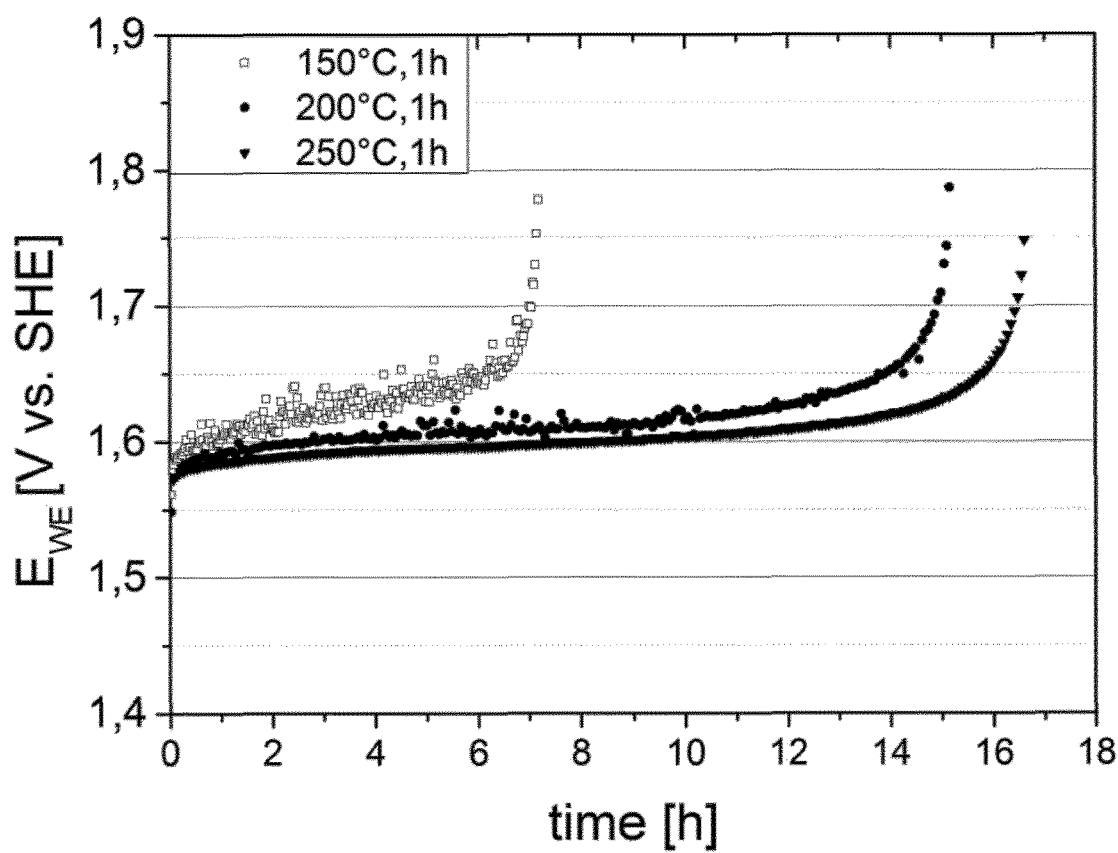
FIG. 7: CP analysis of the catalysts with KOH:Ir=5:1 prepared at 150° C., 100° C., and 250° C. at 15 mA·$cm^{-2}$.

FIG. 7 shows that for MW_5, hydrothermal treatment at 250° C., 1 h yields the most stable catalyst.

Stability and Activity

The activity and stability properties of MW_5 were compared with previously reported compounds and commercial samples.

A chronopotentiometric measurement of the anode potential at constant current densities of 10 mA.cm$^{-2}$ was used. In order to avoid stress on the catalyst, the target current density was reached via a galvanodynamic ramp of 10 µA.cm$^{-2}$. No Nafion was used, as the catalyst adheres to the electrode without it.

This procedure was repeated three times for each compound with three different loadings (20, 50 and 100 µgIr.cm$^{-2}$) in order to ensure some statistical certainty in the results. As an additional advantage, this method provides information on whether the catalyst operates in kinetic control or whether mass-transfer/utilization effects are important

TABLE 4

Benchmarking parameters for MW_5 compared with previously reported compounds and commercial samples

| Catalyst | $\eta_{t=0}$ [V] | $\eta_{t=2\,h}$ [V] | $\eta_{t=24\,h}$ [V] | Metal loading [µg · cm$^{-2}$] | electrolyte |
|---|---|---|---|---|---|
| MW_5 | 0.31 | 0.33 | 0.35 | 20 | H$_2$SO$_4$ 0.5M |
| MW_5 | 0.31 | 0.33 | 0.35 | 50 | H$_2$SO$_4$ 0.5M |

TABLE 4-continued

Benchmarking parameters for MW_5 compared with
previously reported compounds and commercial samples

| Catalyst | $n_{t=0}$ [V] | $n_{t=2\,h}$ [V] | $n_{t=24\,h}$ [V] | Metal loading [µg·cm$^{-2}$] | electrolyte |
|---|---|---|---|---|---|
| MW_5 | 0.3 | 0.32 | 0.33 | 100 | $H_2SO_4$ 0.5M |
| AA-IrO$_x$ | 0.37 | —[b] | — | 20 | $H_2SO_4$ 0.5M |
| SIROF[c] | 0.34 | 0.36 | 0.44 | n.r.[a] | $H_2SO_4$ 1M |
| Sputtered Ru[c] | 0.28 | 0.34 | 0.82 | n.r.[a] | $H_2SO_4$ 1M |
| 20 wt. % Ir/C[d] | 0.38 | n.r | n.r | 28 | KOH 0.1M |
| AIROF[e] | 0.32 | 1.05 | n.r. | n.r. | NaOH 1M | n.r. = not reported
[a] Reactive sputtering resulted in a >100 nm thick film (see J. Am. Chem. Soc. 2015, 137, 4347 and Physical Chemistry Chemical Physics 2014, 16, 3623);
[b] AA-IrO$_x$ was active for only 1.02 h;
[c] J. Am. Chem. Soc. 2015, 137, 4347;
[d] J. Am. Chem. Soc. 2010, 132, 13612;
[e] J. Am. Chem. Soc. 2013, 135, 16977.

The obtained results indicate that the catalytically active materials according to the present invention perform better than any of the benchmark compounds. In particular, the activity of the catalysts after 2 h and 24 h was better than with the benchmarks at all metal loadings.

Therefore, the catalytically active materials according to the invention contradict the popular notion that activity and stability for OER-electrocatalysts in acidic media follow an inverse trend, which previously led to the conclusion that the focus should be on little active but stable rutile-type structures.

Specific Surface Area ($S_{BET}$) Measurements

Static nitrogen physisorption experiments were performed in an Autosorb-1C setup (Quantachrome). Prior to the measurements, samples were degassed for 2 h under dynamic vacuum conditions at 80° C. Using the multipoint method, the value of the specific surface area of the analyzed samples ($S_{BET}$) was derived from the complete isotherm.

TABLE 5 summarizes the specific surface area of samples
according to the invention and comparative examples
MW_50, MW_100, and AA-IrO$_x$ obtained from
nitrogen physisorption experiments.

| Sample | $S_{BET}$ [m$^2$·g$^{-1}$] |
|---|---|
| MW_1 | 217 |
| MW_4 | 165 |
| MW_5 | 104 |
| MW_5, 200° C. | 99 |
| MW_5, 150° C. | 103 |
| MW_7 | 56 |
| MW_10 | 175 |
| MW_50 | 7 |
| MW_100 | 16 |
| AA-IrO$_x$ | 33 |

Electron Microscopy

The morphology of the Ir-compounds was investigated using electron microscopy.

Figure 8:
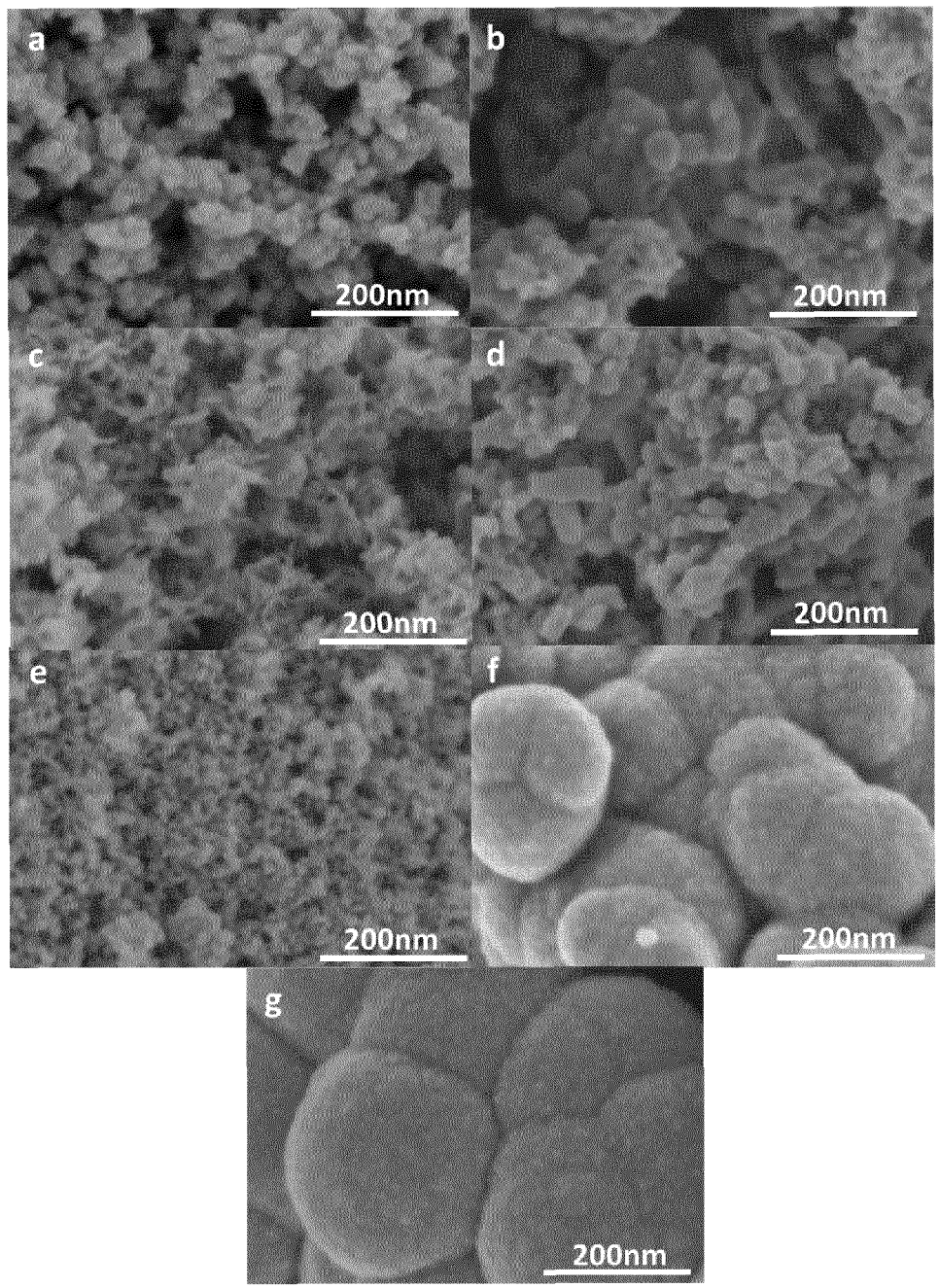
FIG. 8: Scanning Electron Microscopy (SEM) pictures (1.5 kV). Samples prepared by hydrothermal treatment are identified as "MW_X", where X identifies the base to iridium ratio. SEM-pictures relate to MW_1(a), MW_4(b), MW_5(c), MW_7(d), MW_10(e), MW_50(f), MW_100(g).
Figure 9:
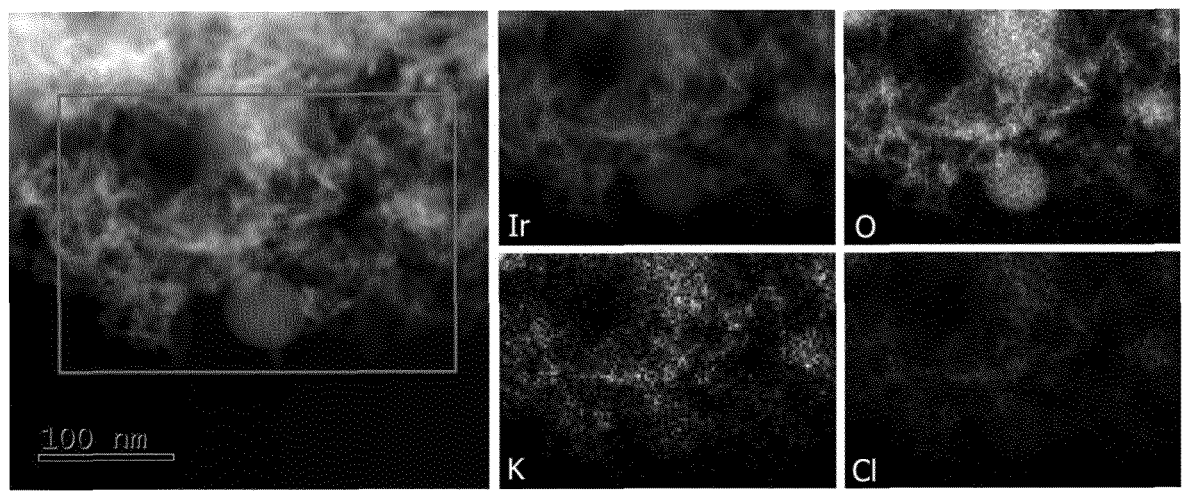
FIG. 9: Scanning Transmission Electron Microscopy (STEM) of the MW_5 sample with corresponding EDX-mapping of Ir, O, K and Cl.

SEM images were captured on a Hitachi S-4800 Field Emission Scanning Electron Microscope, working in the kV-range of 0.1 to 30 and equipped with a secondary electron detector (YAGBSE). The Energy Dispersive X-ray Analysis Data was detected with Bruker EDX System applying a silicon drift detector (SDD). The results are shown in FIG. 8. For high resolution transmission electron microscopy (HRTEM) and STEM, samples were prepared by drop-casting two small drops of sample solution on carbon coated Cu grids. (S)TEM images and EDX elemental mapping were taken on an aberration-corrected JEOL JEM-ARM200 operated at 200 kV. The microscope is equipped with a high angle Silicon Drift EDX detector with the solid angle of up to 0.98 steradians from a detection area of 100 mm$^2$. The results are shown in FIG. 9.

SEM-imaging shows that the chloride containing samples exhibit a highly nanostructured morphology in line with specific surface areas (SBET) over 150 m$^2$.g$^{-1}$ (see MW_1 (a) and MW_4(b), FIG. 8 and Tables 1 and 5).

A dominantly nanosized rod-structure is obtained for the best OER-catalysts MW_4 and MW_5 (FIGS. 8b and 8c). For higher KOH:Ir-ratios, the rods disappear yielding an amorphous material with high SBET (MW_10) (FIG. 8e).

Figure 16:
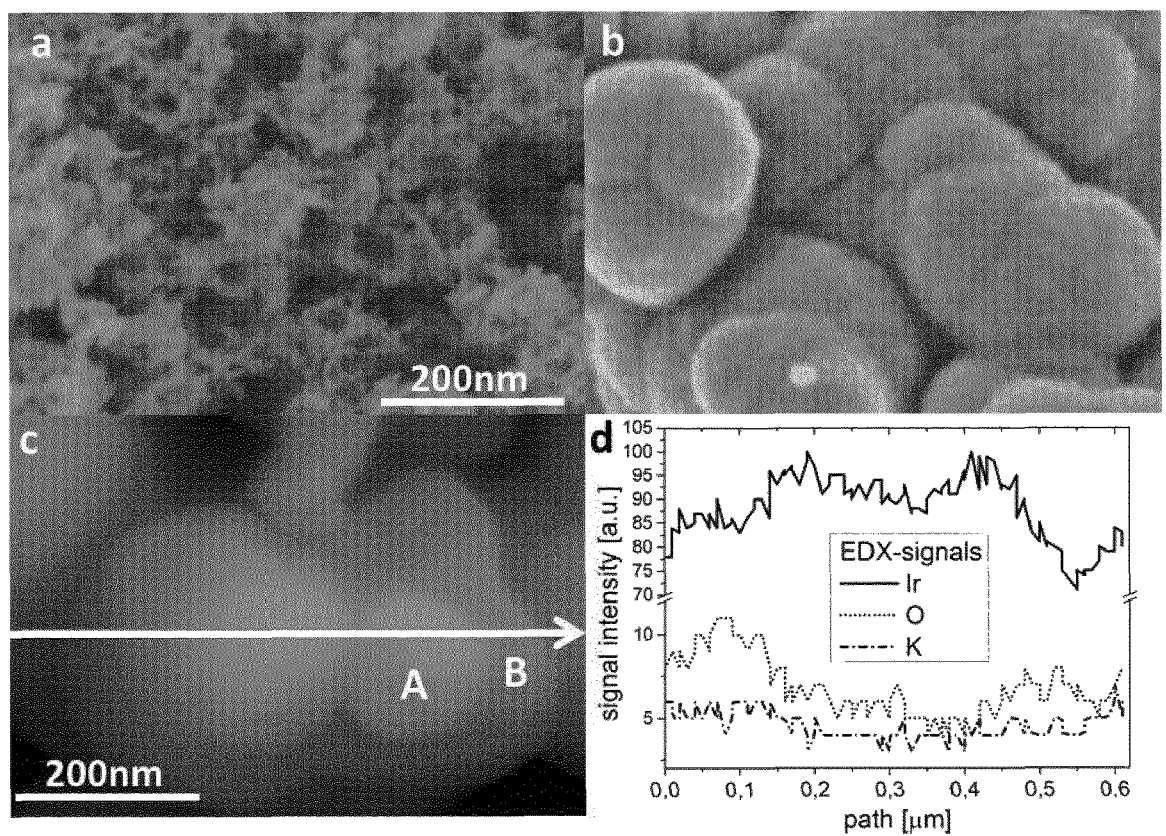
FIG. 16: SEM of MW_5(a) shows a highly nanostructured material, whereas for MW-50(b), big clusters are formed. Secondary electron contrasted-imaging of such a split cluster (c) reveals a core-shell structure, where the metallic iridium (bright twin-cores, A) is coated with a thick layer of amorphous iridium oxohydroxide (B). Linescan (green arrow) confirms lower 0/Ir-ratio in the cores (d).

For comparative examples MW_50 and MW_100, the structure condensates into over 200 nm large spheres, leading to a dramatic decrease in $S_{BET}$. Without wishing to be bound by theory, it seems likely that where the structure takes the form of large spheres, less active sites are exposed, leading to lower mass activity and lower stability at the same current densities. Some of these spheres were cracked open and revealed a core-shell structure comprising a metallic Ir-core coated with a thick Ir-oxohydroxide layer (FIG. 16). It was concluded that in all cases where Ir$^0$ was detected in XRD, metallic iridium is located under such an Ir-oxohydroxide-layer.

Figure 10:
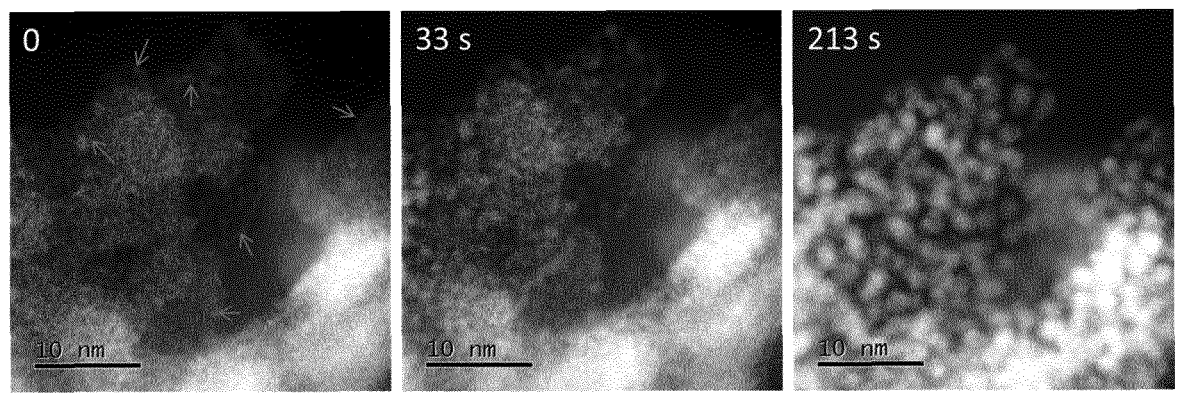
FIG. 10: Beam effect of a 15 μA-electron beam on MW_5 in STEM-mode initially, after 33 s and 213 s

HRTEM-study of MW_5 revealed a high sensitivity of the surface to the electron beam: the surface rapidly transforms into metallic iridium (FIG. 10).

For sample MW_5, additionally to the rod-structures observed in SEM, some 40-50 nm-spheres could also be detected in STEM. It is possible that the nucleation process of Ir$^0$-containing core-shell structures already starts for MW_5 as revealed by the weak shoulder in XRD. However no significant difference in Ir— and O-contents could be detected between rods and spheres. K— and Cl-traces could also be detected.

No reliable structural information about the crystallographic nature of the amorphous iridium-oxohydroxide phase could be extracted from HRTEM/STEM-investigations. Indeed, at higher magnification, under the electron beam the sample rapidly transformed into crystalline cubic iridium. FIG. 10 shows the beam damage for a 15 µA-STEM electron beam over 213 s. Even the initial picture already shows bright spots corresponding to metallic iridium. These spots serve as nucleation sites for rapidly expanding Ir$^0$-nanoparticles.

TGA-MS-coupled Thermogravimetric Analysis (TGMS)

TGA, DSV and evolved gas analysis of the decomposition reaction of the samples under a 21% O$_2$/Ar-stream at 100 mLn.min$^{-1}$, using a 10 K.min$^{-1}$ heating ramp to 800° C.) were performed on a Netzsch STA 449 thermobalance connected to a quadrupole mass spectrometer (QMS200 Omnistar, Balzers). The total oxidation of the samples to rutile-IrO$_2$ and hollandite-K$_{0.25}$IrO$_2$ in case of K-containing samples was verified via XRD of the obtained material.

The decomposition of the samples to crystalline IrO$_2$ during 10° K.min$^{-1}$ heating to 800° C. in 21% O$_2$/Ar (100 mLn.min$^{-1}$) was analyzed in a thermogravimetric experiment. The results confirm the highly hydrated and hydroxylated nature of the oxidic Ir-phase. Samples lose up to 2.5 wt. % of hygroscopic water (first water evolution peak/shoulder at 135° C. in FIG. 13). Water evolution through decomposition of hydroxyl groups goes on till 500° C. and accounts for up to 7 wt. % for the most OER-active samples. With increasing Ir$^0$-content (MW_7 to MW_100), the samples contain less water and exhibit an increasingly strong exothermal mass gain around 540° C., associated with the oxidation of $Ir^0$ to $IrO_2$. The air-normalized water evolution signals detected by mass spectrometry (MS, FIG. 13) show that the catalytically active material according to the present invention (MW_1 to MW_7) lose most water above 150° C., with a strong shoulder above 300° C. Water evolution at these temperatures corresponds to the decomposition of hydroxyl groups. Without wishing to be bound by theory, these results indicate a link between a high fraction of hydroxyl groups stable at higher temperatures and the OER-performance of the samples. The hydroxyl groups may be linked to a higher concentration of OER-active sites (lower overpotentials) and might contribute to their stabilization under water splitting conditions (higher lifetimes).

The analysis also confirms that the catalytically active materials according to the present invention contain large amounts of hygroscopic water and probably hydroxyl-groups.

Temperature-Programmed Reduction (TPR)

TPR of the calcined sample was performed in a fixed-bed reactor (TPDRO-1100, CE instruments), in 4.92 vol. % $H_2$/Ar (80 mLn.min$^{-1}$) at a heating rate of 6 Kmin$^{-1}$ to 450° C. The $H_2$ consumption was monitored with a thermal conductivity detector (TCD). The TCD detector was calibrated by reducing a known amount of CuO. The samples were initially kept under Ar-flow (80 mLn.min$^{-1}$). The comparison of $H_2$-signals during the switch from Ar to 4.92% $H_2$/Ar before and after TPR allows the quantification of the amount of $H_2$ initially absorbed by the sample. No concomitant evolution of water is detected at room temperature, indicating that hydrogen is merely adsorbed on the sample. Once heating starts, $H_2$-consumption features are correlated to evolved water signals detected in the gas outlet via mass spectrometry (MS). Average oxidation states of iridium are calculated from $H_2$-uptake and consumption following:

$$IrO_x(OH)_y + \left(x + \frac{y}{2}\right)H_2 = Ir + \left(x + \frac{y}{2}\right)H_2O$$

The average oxidation state of iridium is $$2 \times \left(x + \frac{y}{2}\right).$$

The amount of hydrogen adsorbed at room temperature is taken into account. No release of the adsorbed hydrogen is detected, meaning that during TPR, the adsorbed hydrogen participates in the reduction. The complete reduction of the sample to $Ir^0$ is verified via XRD.

Table 6 in the Sample composition and average Ir-oxidation state section below summarizes $H_2$-uptake at room temperature (RT) and consumption during TPR as well as the resulting average oxidation state of iridium in the sample.

Figure 14:
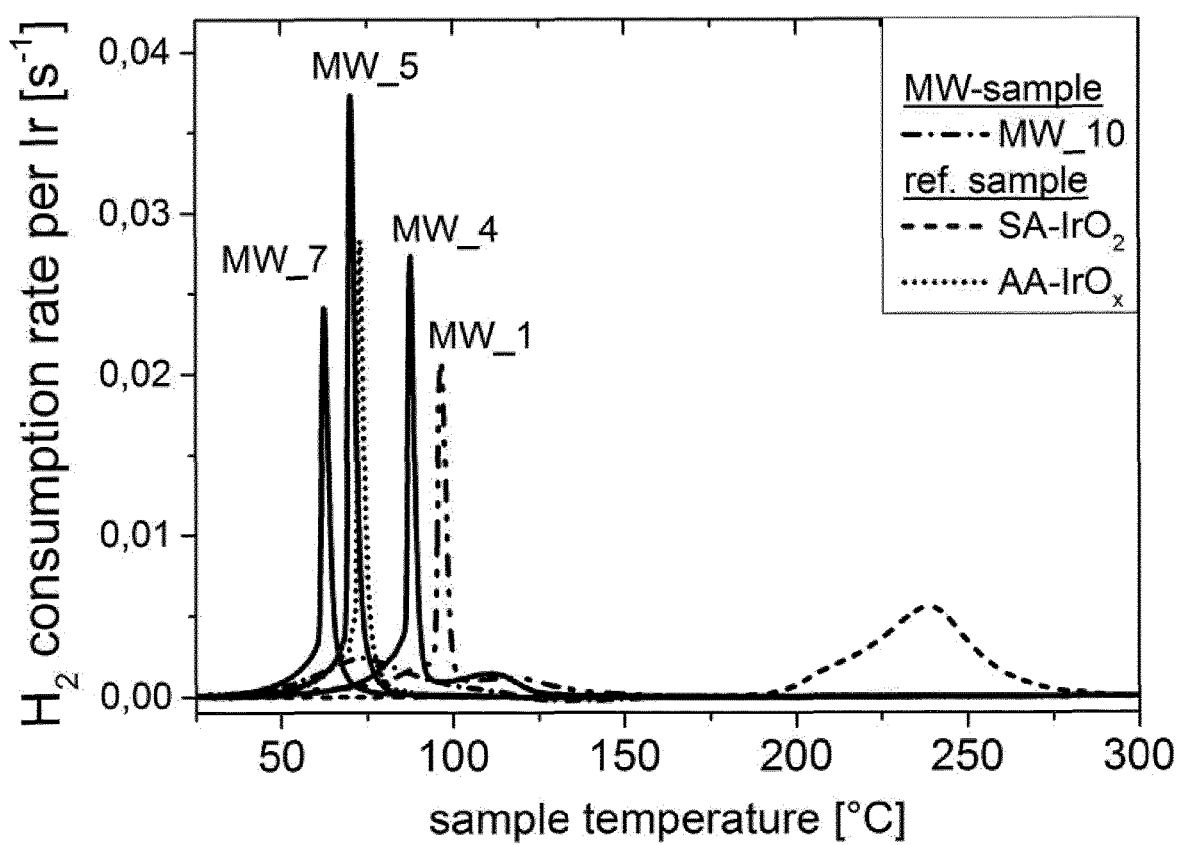
FIG. 14: Temperature programmed reduction in 4.92% $H_2$/Ar of catalytically active material according to the present invention.

Sharp reduction peaks were observed for the best catalytically active materials according to the invention from 65 to 85° C. This reduction behavior is very distinct from the reduction feature above 200° C. usually observed for crystalline $Ir^{IV}O_2$ (SA-$IrO_2$ in FIG. 14) (J. Electrochem. Soc. 2014, 161, F876).

Chloride-containing samples exhibited additional reduction features around 120° C. linked to the reduction of Ir—Cl bonds. With decreasing OER-activity (MW_10 and the comparative example MW_50), the reduction feature broadened dramatically and shifted towards higher temperatures.

Figure 12:
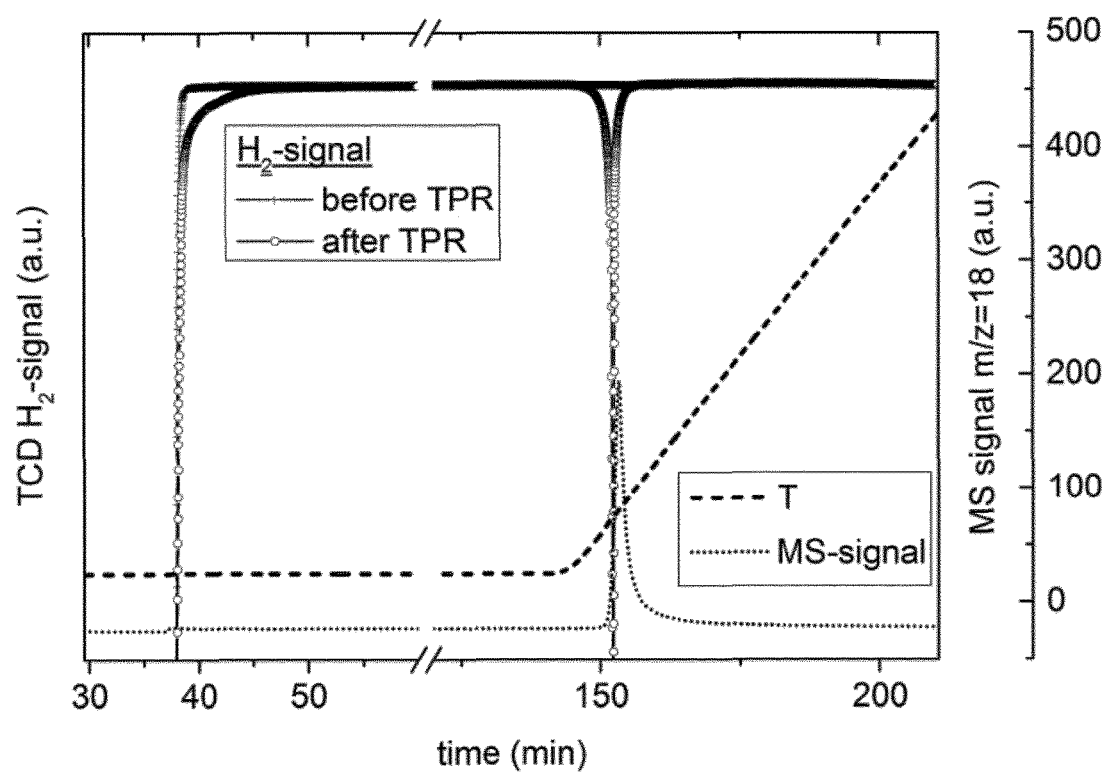
FIG. 12: Typical reduction experiment for a MW_5 sample prepared at 150° C.

At room temperature significant amounts of $H_2$ are absorbed by the sample (see FIG. 15), without concomitant water evolution (FIG. 12). Without wishing to be bound by theory, this may indicate that hydrogen enters the compound structure, possibly opening up the amorphous matrix, explaining the rapid reduction indicated by the sharp single peak during heating. Hydrogen uptake at room temperatures decreases with increasing Cl-content (MW_4 and MW_1) as well as with higher metallic iridium content (samples MW7 upwards). No such adsorption is observed with SA-$IrO_2$. This could mean that hydrogen preferably enters the Cl-free amorphous Ir-oxohydroxide matrix as opposed to $IrO_2$ and metallic $Ir^0$. There seems however not to be a direct correlation with the OER-performance.

Figure 15:
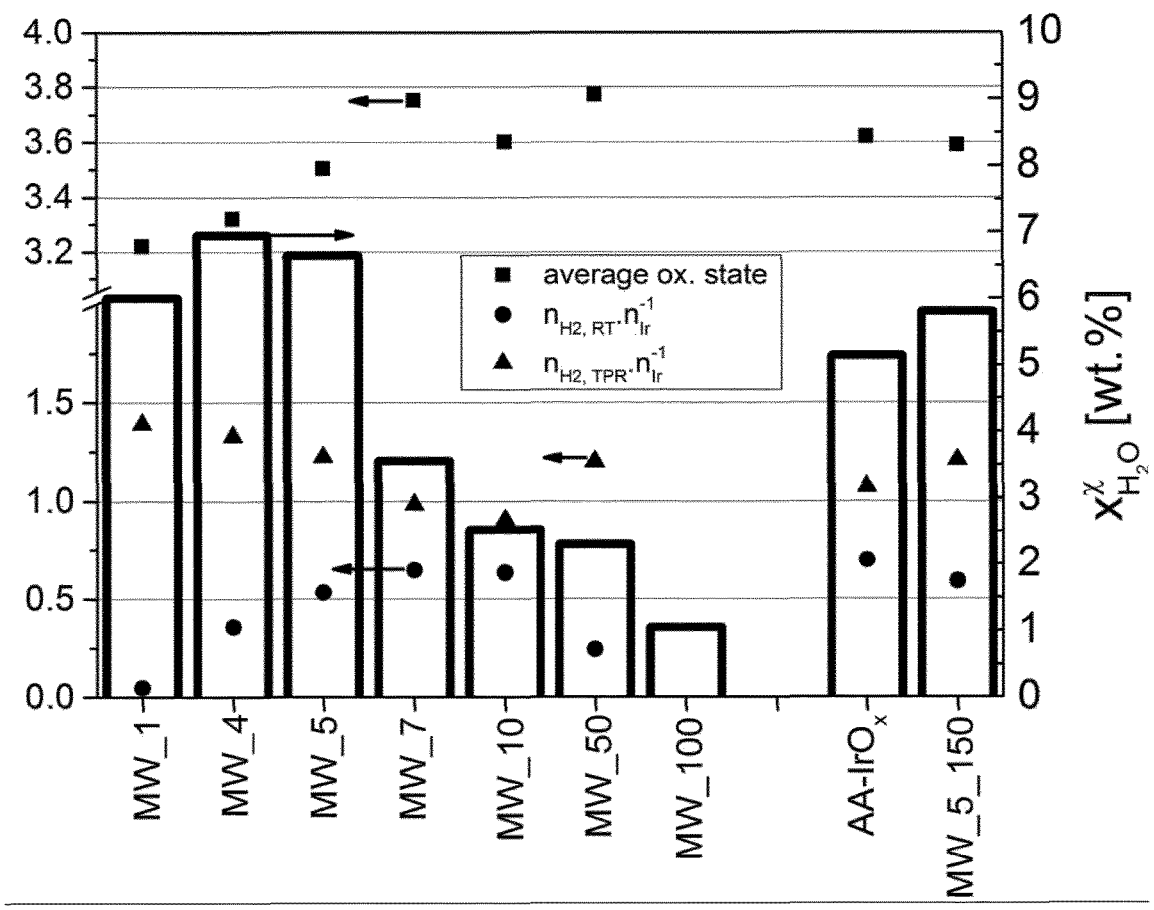
FIG. 15: Bars show fraction of hydroxyl groups removed in MS-coupled thermogravimetric analysis (TGMS) at temperatures above 135° C. The quantification of hydrogen take-up by the sample at room temperature (red dots, left axis, $mol_{H2}·mol_{Ir}^{-1}$) during a temperature programmed reduction (TPR) experiment (green triangles, left axis, $mol_{H2}·mol_{Ir}^{-1}$).

The RT-absorbed $H_2$ later participates in sample reduction during TPR. The average Ir-oxidation state related to the oxidic phase was estimated as detailed above. The black squares in FIG. 15 show that the oxidation state increases from +3.2 for sample MW_1 to +3.5 for MW_5 and up to +3.8 for MW_7. Again no clear correlation with the OER-performance can be detected, although $Ir^{3+}$ and $Ir^{4+}$ probably coexist in the amorphous oxohydroxide structure. Also samples MW_7 and MW_10 and comparative example MW_50 exhibit average oxidation states closer to $Ir^{4+}$ and concomitantly their OER-performance is more similar to that of $Ir^{IV}O_2$. As a result it seems that the presence of an important fraction of $Ir^{3+}$-species is another key to obtaining a readily active Ir-OER-catalyst.

The observed OER-properties seem to correlate with the highly hydroxylated nature of the compounds and a mixed Ir-oxidation state characterized by a single sharp reduction feature below 100° C. The fact that the as prepared samples do not require any electrochemical pretreatment before OER could mean that the sample-surface is similar in nature to the activated catalyst under OER-conditions.

As a result, the catalytically active material according to the present invention constitutes an extremely promising candidate for efficient and stable OER-catalysis. Indeed, they achieve OER-activity and -stability equaling the best benchmarks reported in the literature for much lower loadings.

Sample Composition and Average Ir-Oxidation State

In order to be able to assess the average oxidation state of iridium calculated from hydrogen consumption during TPR, the formula and molar mass of the iridium compounds is required. Taking into account all possible contaminants from initial reactants, the formula is:

$$K_h Rb_k IrCl_l O_x (OH)_y \cdot zH_2O \quad (II)$$

The average oxidation state of iridium is 1+2x+y. The formula of each sample must thus be elucidated in order to assess its average oxidation state.

The molar mass of the compound is given by:

$$M = M_K \times h + M_{Rb} \times k + M_{Cl} \times l + M_{Ir} + M_O \times x + M_{OH} \times y + M_{H_2O} \times z$$

K/Ir—, Rb/Ir- and Cl/Ir-ratios (h,k,l) were determined easily from XRF (see Table 1).

TGMS gives access to the amount of chemisorbed and physisorbed water (two equations linking y and z) via the subsequent mass loss corresponding to the removal of first physisorbed water (mass fraction $x_{m,H_2O}^\varphi$) and later chemisorbed water through hydroxyl decomposition (mass fraction $x_{m,H_2O}^x$).

Physisorbed Water:

$$z \times n_{tot} = n_{H2O}^{\varphi} \Leftrightarrow z \times \frac{m_{tot}}{M} = \frac{m_{H2O}^{\varphi}}{18}$$

$$M \times x_{m,H2O}^{\varphi} = 18z$$

Chemisorbed Water:

$$(OH)_y = O_{y/2} + \frac{y}{2} H_2O$$

$$\frac{y}{2} \times n_{tot} = n_{H2O}^{x} \Leftrightarrow \frac{y}{2} \times 18 = M \times x_{m,H2O}^{x}$$

$$M \times x_{m,H2O}^{x} = 9y$$

TPR yields a third equation linking x and y:

$$lCl + xO + yOH + \left(\frac{l}{2} + x + \frac{y}{2}\right)H_2 = lHCl + (x+y)H_2O$$

$$n_{H2} = \left(\frac{l}{2} + x + \frac{y}{2}\right)n_{sample} = \left(\frac{l}{2} + x + \frac{y}{2}\right)\frac{m_{sample}}{M}$$

$$n_{H2} \times M = \left(\frac{l}{2} + x + \frac{y}{2}\right)m_S$$

The result is a system of three linear equations in x, y and z, that was solved numerically using Wolfram Mathematica software, after inserting known coefficients h, k, l, $x_{m,H2O}^{\varphi}$, $x_{m,H2O}^{x}$, $n_{H2}$ and $m_s$:

$$M \times X_{m,H2O}^{\varphi} = 18z$$

$$M \times x_{m,H2O}^{x} = 9y$$

$$n_{H2} \times M = \left(\frac{l}{2} + x + \frac{y}{2}\right)m_S$$

Remarks concerning coefficients h, k, l, $x_{m,H2O}^{\varphi}$, $x_{m,H2O}^{x}$, $n_{H2}$ and $m_s$:

The mass fraction of physisorbed water $x_{m,H2O}^{\varphi}$ corresponds to the mass loss detected via TGMS from 25° C. to 135° C. (see FIGS. 11 and 13).

The mass fraction of hydroxyl groups $x_{m,H2O}^{x}$ corresponds to the mass loss from 135° C. to 500° C. The mass gain due to oxidation of $Ir^{3+}$ to $Ir^{4+}$ and mass loss due to the decomposition of surface carbonate and formate species were neglected. Also possible mass loss due to labile OH-species below 135° C. is neglected.

For the determination of $n_{H2}$, the amount of hydrogen adsorbed at room temperature is taken into account. Indeed no release of the adsorbed hydrogen is detected before or during heating, meaning that during TPR, the adsorbed hydrogen participates in the reduction. The complete reduction of the sample to $Ir^0$ is verified via XRD.

In order to relate the average oxidation state solely to the oxidic phase, the amount of metallic $Ir^0$ is estimated from the sharp mass gain detected above 500° C. in the samples according to the invention MW_7 and MW_10, and comparative example MW_50. This mass gain is associated to the oxidation of $Ir^0$ to $IrO_2$ and the initial molar metallic iridium content can be estimated following:

$$\%_{mass\ gain,ox} = \frac{32 \times x_{Ir^0}}{M_{ini}}$$

TABLE 6 summarizes $H_2$-uptake at room temperature (RT) and consumption during TPR as well as the resulting average oxidation state of iridium in the sample related to the non-metallic phase.

| Sample | $x_{m,H2O}^{\varphi}$ | $x_{m,H2O}^{x}$ | $n_{H2} \cdot n_{Ir}^{-1}$ @ TPR | $n_{H2} \cdot n_{Ir}^{-1}$ @ TPR | $Ir^0$-content [mol. %] | Ir-redox state |
|---|---|---|---|---|---|---|
| MW_1 | 2.7 | 6.0 | 0.05 | 1.39 | 0 | 3.22 |
| MW_4 | 2.6 | 7.0 | 0.36 | 1.33 | 0 | 3.32 |
| MW_5 | 1.9 | 6.7 | 0.53 | 1.22 | 0 | 3.51 |
| MW_7 | 1.9 | 3.6 | 0.65 | 0.98 | 13.2 | 3.75 |
| MW_10 | 2.6 | 2.5 | 0.63 | 0.91 | 14.6 | 3.60 |
| MW_50 | 1.7 | 2.3 | 0.24 | 1.20 | 23.6 | 3.77 |
| MW_100 | 1.2 | 1.05 | n.d. | n.d. | n.d. | n.d. |
| MW_5_150° C. | 2.7 | 5.8 | 0.70 | 1.07 | 0 | 3.59 |
| SA-IrO$_2$ | 0.1 | 0 | 0 | 2.04 | 0 | 4.08 |
| AA-IrO$_2$ | 0.9 | 5.1 | 0.59 | 1.21 | 2.4 | 3.62 |

The total Ir-content ($x_{wt,Ir}$) and the metallic iridium content $x_{mol,Ir^0}$ were determined via TGMS following the above equations.

1 mol of Ir present in the catalytically active compound can be split up into the respective molar contents of metallic and oxidic iridium as follows:

$$Ir = x_{mol,Ir^0} Ir^0 + (1 - x_{mol,Ir^0}) Ir_{oxidic}$$

If one now wishes to determine the oxidic Ir-content ($x_{wt,Ir-oxohydroxide}$), this is given by:

$$x_{wt,Ir-oxohydroxide} = \frac{(1 - x_{mol,Ir^0}) \times M_{Ir}}{M_{tot}} = (1 - x_{mol,Ir^0}) \times x_{wt,Ir}$$

In this equation is:

$M_{tot}$ the molar mass of the compound identified above by formula (II), $M_{Ir}$ is the molar mass of Ir, $x_{wt,Ir-oxohydroxide}$ the mass fraction (weight fraction) of the Iridium atoms present as amorphous Ir-oxohydroxide in the catalytically active material, $x_{wt,Ir}$ the mass fraction (weight fraction) of all Ir species present in the catalytically active material, and $x_{mol,Ir^0}$ the molar fraction of $Ir^0$ based on the total molar amount of all Ir species.

The results are listed in the following table 7.

| Sample | $x_{wt,Ir}$ | $x_{mol,Ir^0}$ | $x_{wt,Ir-oxohydroxide}$ |
|---|---|---|---|
| MW_1 | 0.763 | 0 | 0.763 |
| MW_4 | 0.765 | 0 | 0.765 |
| MW_5 | 0.794 | 0 | 0.794 |
| MW_7 | 0.818 | 0.132 | 0.71 |
| MW_10 | 0.823 | 0.146 | 0.703 |
| MW_50 | 0.842 | 0.235 | 0.643 |

It is thus seen that one sample with a poor performance and BET values outside the claims (MW_50) contains a fraction of 64.3 wt. % Ir atoms present as amorphous Ir-oxohydroxide, whereas for the best sample (MW_5) this value reaches 79.4 wt. %.

The invention claimed is:

1. A catalytically active material for the electrochemical oxidation of water, wherein the catalytically active material comprises an amorphous Ir-oxohydroxide, wherein the catalytically active material has a specific surface area ($S_{BET}$) of $\geq 50$ m$^2$.g$^{-1}$.

2. The catalytically active material according to claim 1, wherein the $S_{BET}$ of the amorphous Ir-oxohydroxide is $50 \leq S_{BET} \leq 200$ m$^2$.g$^{-1}$.

3. The catalytically active material according to claim 1, wherein the surface morphology of the catalytically active material comprises nanosized rods.

4. The catalytically active material according to claim 3, wherein the nanosized rods are aggregated.

5. The catalytically active material according to claim 1, wherein the X-ray diffraction pattern of the catalytically active material shows one broad peak at 34° and optionally one further broad peak in the range of 55 to 60.5°.

6. The catalytically active material according to claim 1, wherein the catalytically active material comprises at least 80 wt % of the amorphous Ir-oxohydroxide.

7. The catalytically active material according to claim 1, wherein the amorphous Ir-oxohydroxide has a mixed III/IV Ir-oxidation state wherein the average redox state of the Iridium is in the range +3.20 to +3.75.

8. The catalytically active material according to claim 1, wherein the chloride content relative to the catalytically active material when measured by X-ray fluorescence analysis using a Sequential Pioneer S4 spectrometer from Bruker in an inert He-atmosphere for non-destructive analysis is 10 wt % or less of the catalytically active material.

9. The catalytically active material according to claim 1, wherein metallic iridium is substantially absent from the surface, such that no changes are detected from the first to the 20$^{th}$ cycle below 0.2V compared to standard hydrogen electrode (SHE) in acidic media as measured using cyclic voltammetry (CV).

10. The catalytically active material according to claim 1, wherein the water content of the catalytically active material is 2 to 12 wt % of the catalytically active material, measured by 10° C.min$^{-1}$ heating from 25° C. to 500° C. in 21% O$_2$/Ar (100 mLn.min$^{-1}$) in a thermogravimetric experiment.

11. The catalytically active material according to claim 1, obtained by the thermal treatment of hydrated Ir precursor species.

12. An electrode coated with the catalytically active material according to claim 1.

13. A proton exchange membrane (PEM) based electrolyzer comprising the electrode according to claim 12.

14. The catalytically active material according to claim 1, wherein the X-ray diffraction pattern of the catalytically active material is essentially free from peaks corresponding to cubic metallic iridium at 2θ=40.5°, such that the area under the most prominent peak at 2θ=40.5° is at most 10% of the area under the broad peak at 2θ=34°.

15. The catalytically active material according to claim 1, wherein the amorphous Ir-oxohydroxide conforms to the following formula $$K_h Rb_k Ir Cl_l O_x(OH)_y \cdot zH_2O \qquad (II)$$

wherein h is in the range $0 \leq h < 0.15$; k is in the range $0 \leq k < 0.15$; l is in the range $0 \leq l < 0.40$; x is in the range $1.0 < x < 2.0$, y is in the range $0 < y < 2.0$, and z is 2 or more, and wherein $3 < (1+2x+y) < 4$.

* * * * *